(12) United States Patent
Meade et al.

(10) Patent No.: US 11,774,315 B2
(45) Date of Patent: Oct. 3, 2023

(54) FLEXIBLE LID SEAL INTEGRITY SENSOR

(71) Applicant: Teledyne Instruments, Inc., Thousand Oaks, CA (US)

(72) Inventors: Eric E. Meade, Pocasset, MA (US); Stephen Wright, South Yarmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 520 days.

(21) Appl. No.: 16/999,347

(22) Filed: Aug. 21, 2020

(65) Prior Publication Data
US 2022/0057290 A1 Feb. 24, 2022

(51) Int. Cl.
G01M 3/36 (2006.01)

(52) U.S. Cl.
CPC ..................... G01M 3/36 (2013.01)

(58) Field of Classification Search
CPC ................ G01M 3/36; G01M 3/366
See application file for complete search history.

(56) References Cited

U.S. PATENT DOCUMENTS

| | | |
|---|---|---|
| 4,306,448 A | 12/1981 | Rohde |
| 4,315,427 A | 2/1982 | Leiter et al. |
| 4,706,494 A | 11/1987 | Creed et al. |
| 4,747,299 A | 5/1988 | Fox et al. |
| 4,771,630 A | 9/1988 | Croce et al. |
| 4,899,574 A * | 2/1990 | Potteiger ............... G01M 3/366 73/49.3 |
| 4,922,746 A | 5/1990 | Hulsman et al. |
| 4,934,180 A | 6/1990 | Hulsman |
| 5,029,463 A | 7/1991 | Schvester et al. |
| 5,082,366 A | 1/1992 | Tyson, II et al. |
| 5,105,654 A | 4/1992 | Maruyama et al. |
| 5,111,684 A | 5/1992 | Stauffer et al. |

(Continued)

FOREIGN PATENT DOCUMENTS

| | | |
|---|---|---|
| DE | 102004016549 A1 | 10/2005 |
| EP | 0380863 A1 | 8/1990 |

OTHER PUBLICATIONS

European Search Report for European Application No. 20192256 completed Jan. 18, 2021, 8 pages.

(Continued)

Primary Examiner — David Z Huang
(74) Attorney, Agent, or Firm — K&L Gates LLP

(57) ABSTRACT

A flexible lid seal detector incorporates a compression body having a cavity including a sensor. The detector has a distal end comprising a plurality of concentric compression rings surrounding the cavity. An outer-most ring is defined by outer and inner shaping rims. The distal end includes a recessed lid deflection volume defined by the inner rim and a distal surface of the compression body. The deflection volume may receive a portion of a flexible lid when at least one of the rings applies a compressive force thereto, thereby deforming the lid into the deflection volume. The deflection volume may include a second compression ring and its respective inner and outer shaping rims. A seal detector system may include the detector with a controller configured to receive data from the sensor for a predetermined period of time while the detector applies the compressive force to the lid.

15 Claims, 18 Drawing Sheets

(56) References Cited

U.S. PATENT DOCUMENTS

| | | | |
|---|---|---|---|
| 5,156,329 | A | 10/1992 | Farrell |
| 5,195,360 | A | 3/1993 | Knigge |
| 5,199,296 | A | 4/1993 | Lehmann |
| 5,287,729 | A | 2/1994 | Lehmann |
| 5,365,774 | A | 11/1994 | Horlacher |
| 5,497,654 | A | 3/1996 | Lehmann |
| 5,513,516 | A | 5/1996 | Stauffer |
| 5,528,925 | A | 6/1996 | Sherepa et al. |
| 6,167,751 | B1 | 1/2001 | Fraim et al. |
| 6,330,823 | B1 | 12/2001 | Raymond |
| 6,609,414 | B2 | 8/2003 | Mayer et al. |
| 7,571,636 | B2 | 8/2009 | Mayer |
| 7,578,170 | B2 | 8/2009 | Mayer et al. |
| 7,624,623 | B2 | 12/2009 | Mayer et al. |
| 8,327,690 | B2 | 12/2012 | Bonfiglioli |
| 8,443,806 | B2 | 5/2013 | Morelli et al. |
| 2013/0104664 | A1 | 5/2013 | Chevalier |
| 2014/0260557 | A1* | 9/2014 | Chevalier, Jr. .......... G01M 3/36 73/52 |

OTHER PUBLICATIONS

International Search Report and Written Opinion for PCT/US2014/022040, dated Jun. 26, 2014 (12 pages).
Internationai Preliminary Report on Patentability for PCT/US2014/022040, dated Sep. 15, 2015 (9 pages).

* cited by examiner

FLEXIBLE LID SEAL INTEGRITY SENSOR

BACKGROUND

Flexible lids are used for sealing containers in a variety of industries, including food packaging, medical supplies, and industrial supplies. In most applications, the flexible lid is sealed to the container to protect the product within the container. The seal must be a high integrity seal to prevent leaking of air into and/or out of the container. Seals need to be tested during manufacture to ensure that the product is protected within the container for shipment and storage.

During the continuous production of sealed containers with a flexible lid in a 'Form, Fill, Seal' manufacturing environment (or similar) there presently is not a sufficiently repeatable and reliable way to verify that the joining of a flexible lid to a rigid or flexible container has been achieved successfully (leak free). If the seal cannot be verified then the following failure modes may exist:

Leakage of the product outside the container via egress thru an opening in the seal may cause the product not to be available for sale as advertised;

Spoilage of the product by the ingress of microbes into the internal container volume via an opening in the seal may cause the product not to be available for sale as advertised and is unsafe for use; or Lack of seal integrity of the container may be discovered at an off-production site causing the rejection of the containers and their contents, and resulting in scrapping/disposing of the product lot due to the time interval between production location and inspection location, reducing the product produced and increasing costs to the manufacturer and consumer.

It is therefore desirable to develop a method to test container seals during the sealing process to reduce the possibility of unsealed product from being produced and shipped to receiving parties

SUMMARY

In one aspect, a flexible lid seal detector may include a cylindrical compression body having a longitudinal axis having a longitudinal central cavity having an axis co-axial with the longitudinal axis of the compression body and a sensor disposed within the longitudinal cavity. The compression body may also include a distal end composed of a plurality of mutually concentric compression rings surrounding the longitudinal cavity, wherein an outer-most compression ring of the plurality of mutually concentric compression rings is defined by a first outer shaping rim and a first inner shaping rim, and a recessed lid deflection volume defined by the inner shaping rim and a distal surface of the distal end of the compression body. The recessed lid deflection volume may be configured to receive a first portion of an outer surface of a flexible lid when at least one of the plurality of compression rings contacts and applies a compressive force to a second portion of the outer surface of the flexible lid thereby deforming the first portion of the outer surface of the flexible lid into the lid deflection volume.

In one aspect, a flexible lid seal detection system may include a flexible lid seal detector having a cylindrical compression body, a translation device configured to controllably raise or lower the compression body, and a control device. The flexible lid seal detector may include the cylindrical compression body having a longitudinal axis with a longitudinal central cavity having an axis co-axial with the longitudinal axis of the compression body and a sensor disposed within the longitudinal cavity. In some non-limiting aspects, the longitudinal central cavity may be a cylindrical central cavity. The compression body may also include a distal end composed of a plurality of mutually concentric compression rings surrounding the longitudinal cavity, wherein an outer-most compression ring of the plurality of mutually concentric compression rings is defined by a first outer shaping rim and a first inner shaping rim, and a recessed lid deflection volume defined by the inner shaping rim and a distal surface of the distal end of the compression body. The control device may be composed of at least one processor, and one or more memory components. The one or more memory components may be configured to store instructions that, when executed by the at least one processor, cause the at least one processor to:

cause the translation device to lower the compression body until at least one of the plurality of compression rings contacts a first portion of an outer surface of a flexible lid under test;

cause the translation device to further lower the compression body until the at least one of the plurality of compression rings applies a predetermined compressive force to the portion of the outer surface of the flexible lid, thereby deforming a second portion of the outer surface of the flexible lid to enter the lid deflection volume;

receive, from the sensor, data characterizing the second portion of the outer surface of the flexible lid;

calculate, based on the data, one or more parameters related to a quality of a seal between the flexible lid and a container attached thereto; and determine, based on the one or more parameters, the quality of the seal between the flexible lid and the container attached thereto.

In one aspect, a method for determining a quality of a seal between a flexible lid and a container attached thereto. The method may include contacting a first portion of an outer surface of the flexible lid with a distal end of a flexible lid seal detector, in which the distal end of the flexible lid seal detector includes a distal end of a sensor disposed within a central cavity formed within the flexible lid seal detector, a plurality of mutually concentric compression rings surrounding the longitudinal cavity, in which an outer-most compression ring of the plurality of mutually concentric compression rings is defined by a first outer shaping rim and a first inner shaping rim, and a recessed lid deflection volume defined by the inner shaping rim and a distal surface of the distal end of the compression body. The method may additionally include applying a compressive force by the distal end of the flexible lid seal detector to the first portion of the outer surface of the flexible lid, thereby causing a first portion of a headspace gas within the container to move into a lid shape volume within the container and a second portion of the headspace gas to move into a seal stress volume, in which the first portion of the headspace gas in the lid shape volume causes a second portion of the flexible lid to deform into the recessed lid deflection volume, and the second portion of the headspace gas in the seal stress volume applies a stress to the seal between the flexible lid and the container attached thereto. The method may further include receiving, by a processor for a predetermined period of time, data from the sensor characterizing the second portion of the outer surface of the flexible lid, calculating, by the processor, one or more parameters related to a quality of the seal between the flexible lid and a container attached thereto based on the data, and determining, by the processor, the quality of the seal between the flexible lid and the container attached thereto based on the one or more parameters.

FIGURES

The features of the various aspects are set forth with particularity in the appended claims. The various aspects, however, both as to organization and methods of operation, together with advantages thereof, may best be understood by reference to the following description, taken in conjunction with the accompanying drawings as follows:

Figure 4:
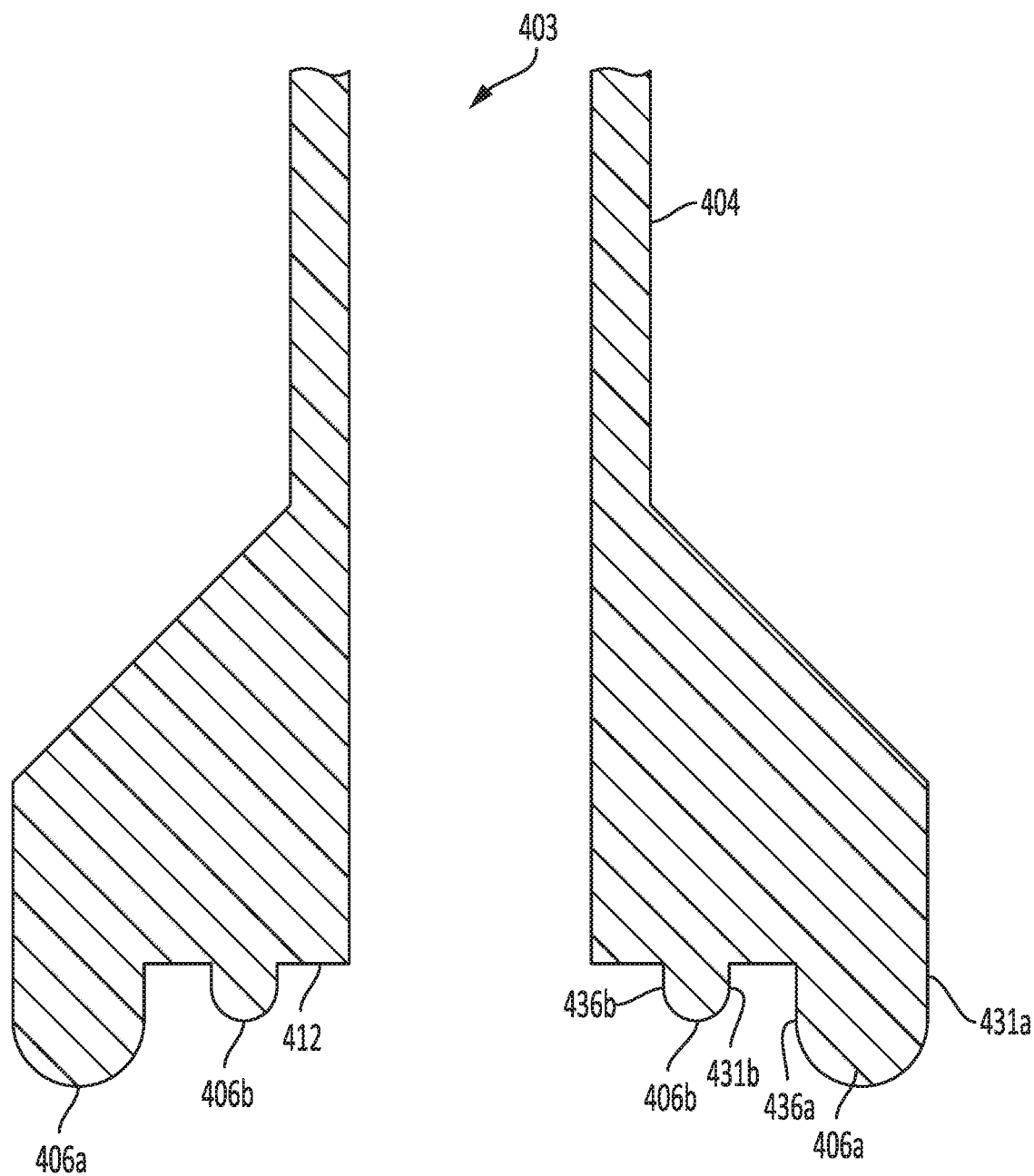
FIG. 4 illustrates a compression body for use with a flexible lid seal detector, in accordance with a second aspect of this disclosure.
Figure 8:
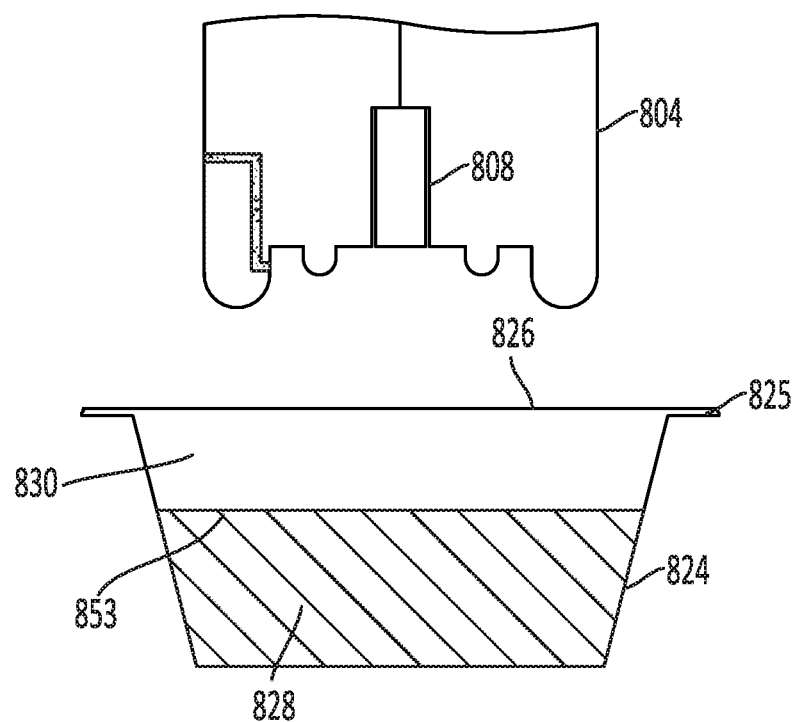
Figure 9A:
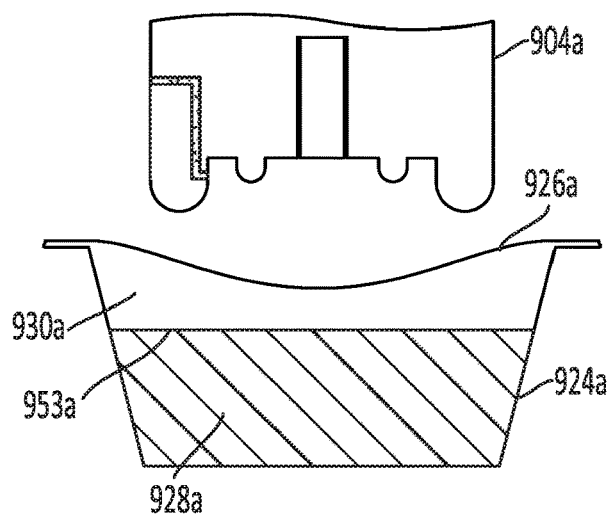
Figure 9B:
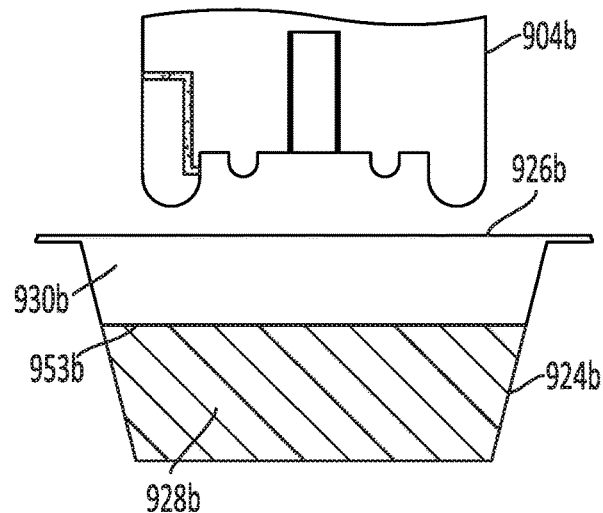
Figure 9C:
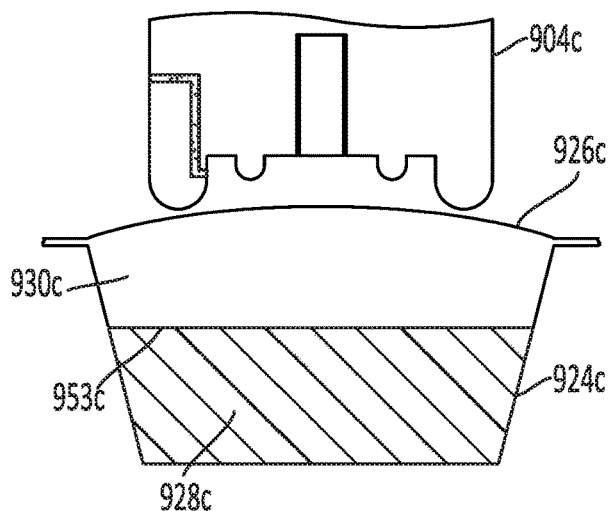
Figure 10A:
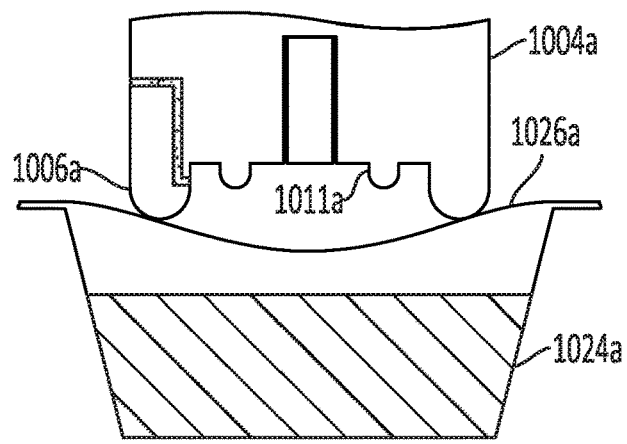
Figure 10B:
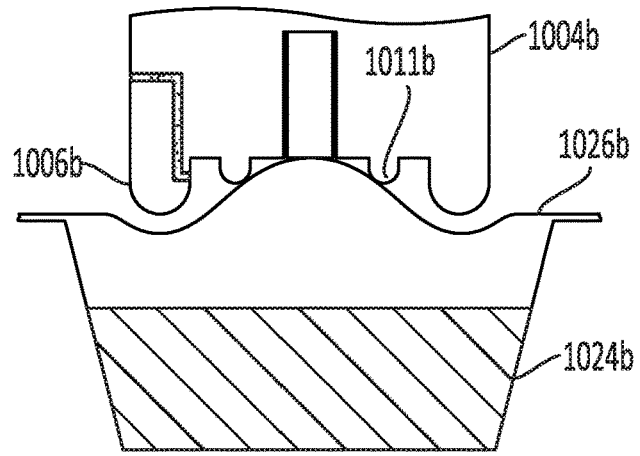
Figure 10C:
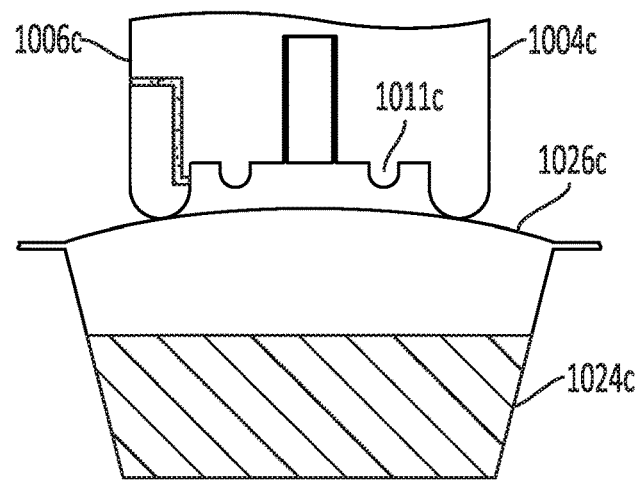
Figure 11A:
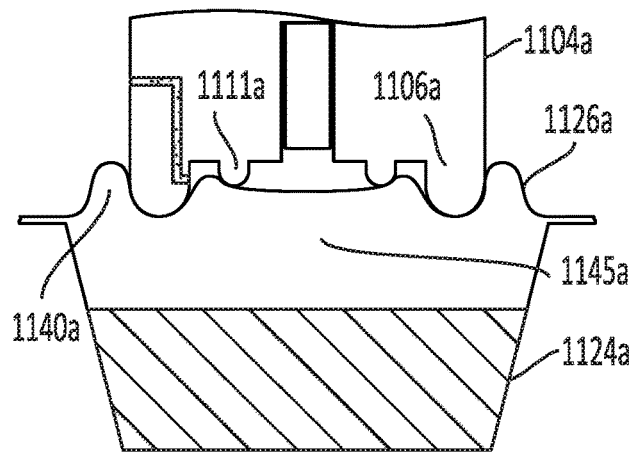
Figure 11B:
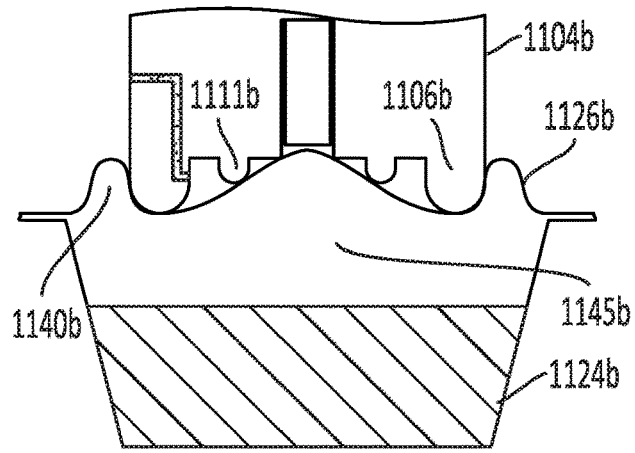
Figure 11C:
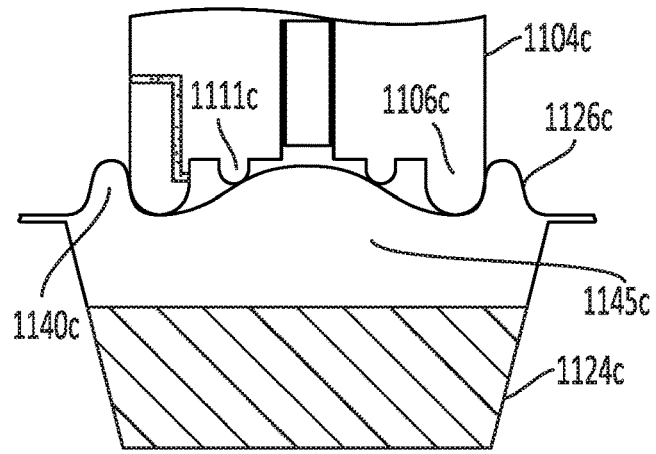

FIGS. 8-11A,11B, and 11C illustrate a process of using the lid profile measurement sensor of FIG. 4 to determine the existence of a leak of a flexible lid, in accordance with an aspect of this disclosure, wherein:

FIG. 8 illustrates the lid profile measurement sensor of FIG. 4 before being applied to the flexible lid, in accordance with an aspect of this disclosure;

FIGS. 9A, 9B, and 9C illustrate the lid profile measurement sensor of FIG. 4 before being applied to the flexible lid of a container having a content colder than ambient temperature, at ambient temperature, and hotter than ambient temperature, respectively, in accordance with an aspect of this disclosure;

FIGS. 10A, 10B, and 10C illustrate the lid profile measurement sensor of FIG. 4 contacting the flexible lid of a container having a content colder than ambient temperature, at ambient temperature, and hotter than ambient temperature, respectively, in accordance with an aspect of this disclosure; and FIGS. 11A, 11B, and 11C illustrate the lid profile measurement sensor of FIG. 4 applying pressure to the flexible lid of a container having a content colder than ambient temperature, at ambient temperature, and hotter than ambient temperature, respectively, in accordance with an aspect of this disclosure.

Figure 12A:
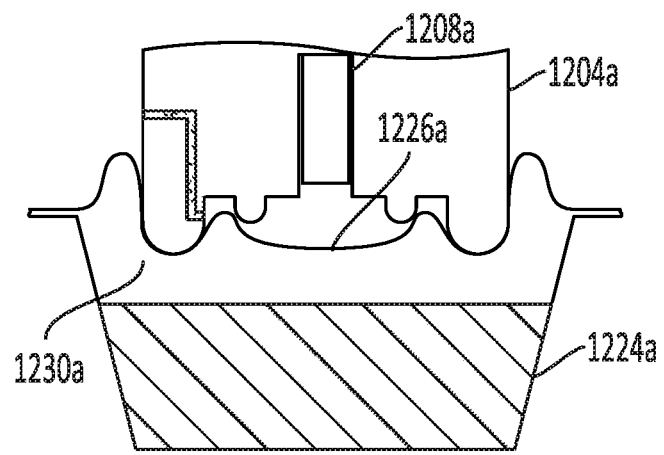
Figure 12B:
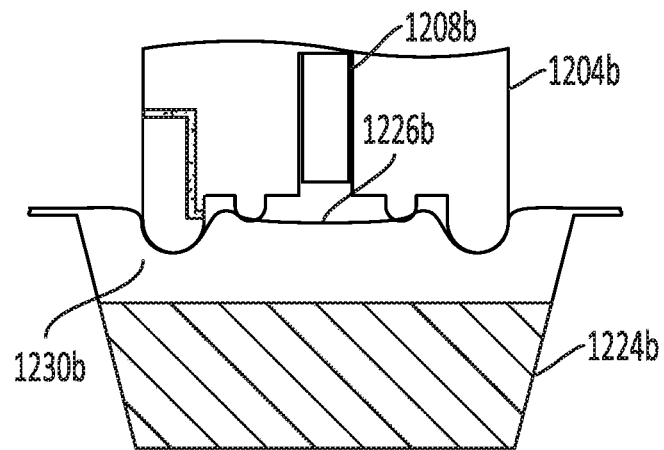

FIGS. 12A and 12B illustrate the lid profile measurement sensor of FIG. 4 applying pressure to the flexible lid of a container having a content colder than ambient temperature, wherein the flexible lid has an intact seal and a leaking seal, respectively, in accordance with an aspect of this disclosure.

Figure 13A:
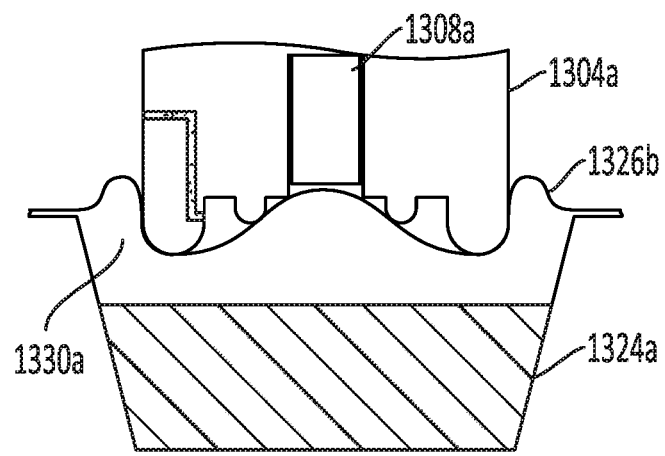
Figure 13B:
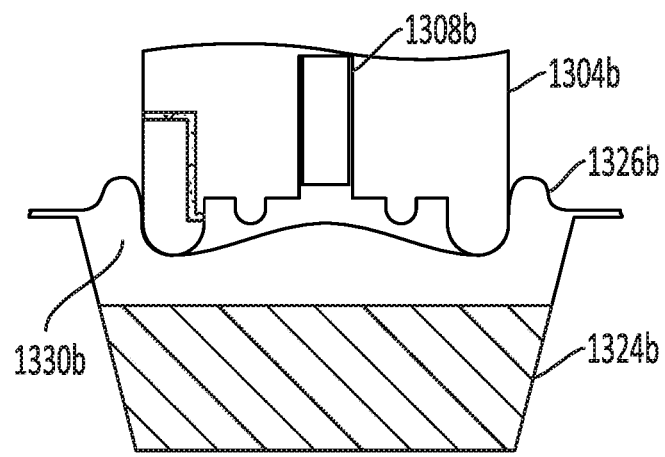

FIGS. 13A and 13B illustrate the lid profile measurement sensor of FIG. 4 applying pressure to the flexible lid of a container having a content at ambient temperature, wherein the flexible lid has an intact seal and a leaking seal, respectively, in accordance with an aspect of this disclosure.

Figure 14A:
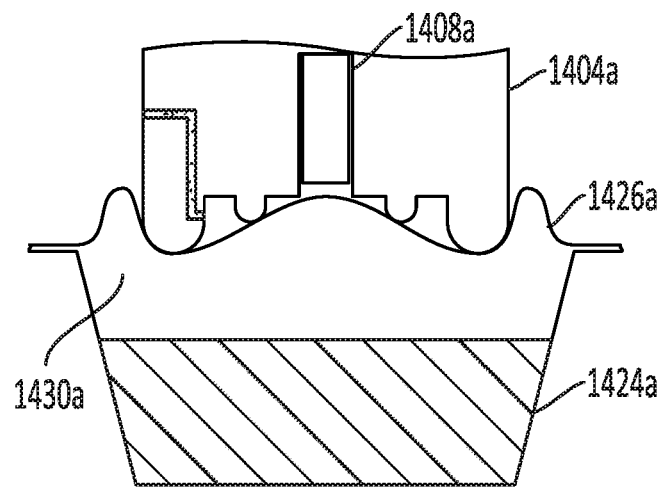
Figure 14B:
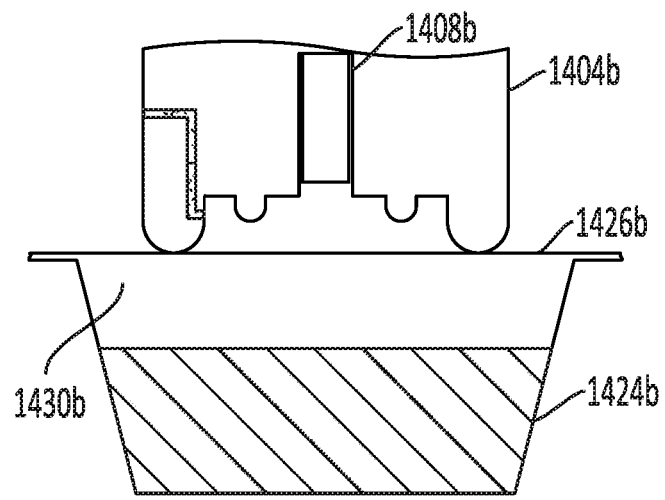

FIGS. 14A and 14B illustrate the lid profile measurement sensor of FIG. 4 applying pressure to the flexible lid of a container having a content hotter than ambient temperature, wherein the flexible lid has an intact seal and a leaking seal, respectively, in accordance with an aspect of this disclosure.

Figure 15:
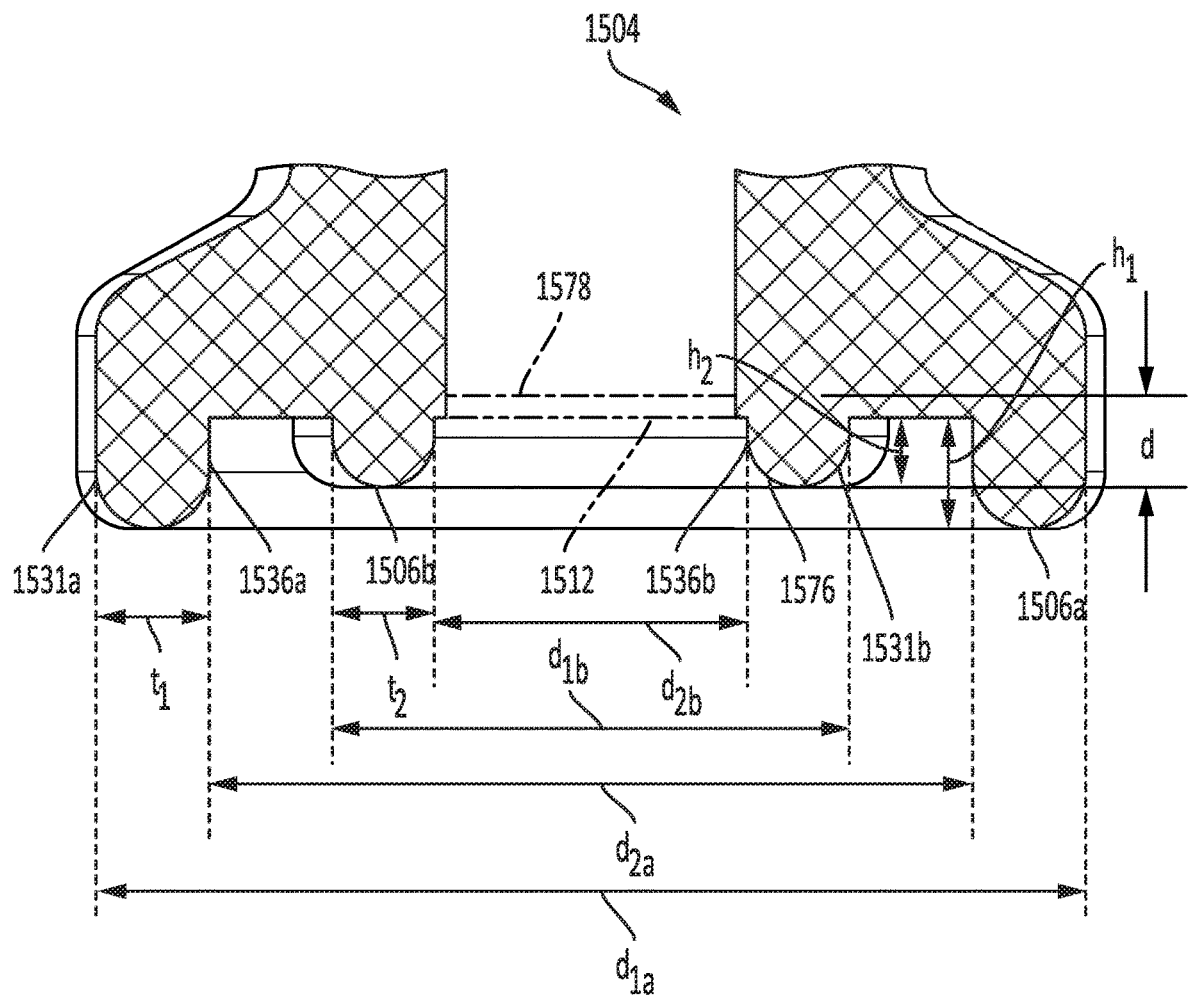

FIG. 15 illustrates a detailed cross-sectional view of the distal end of the lid profile measurement sensor of FIG. 4, in accordance with an aspect of this disclosure.

Figure 16:
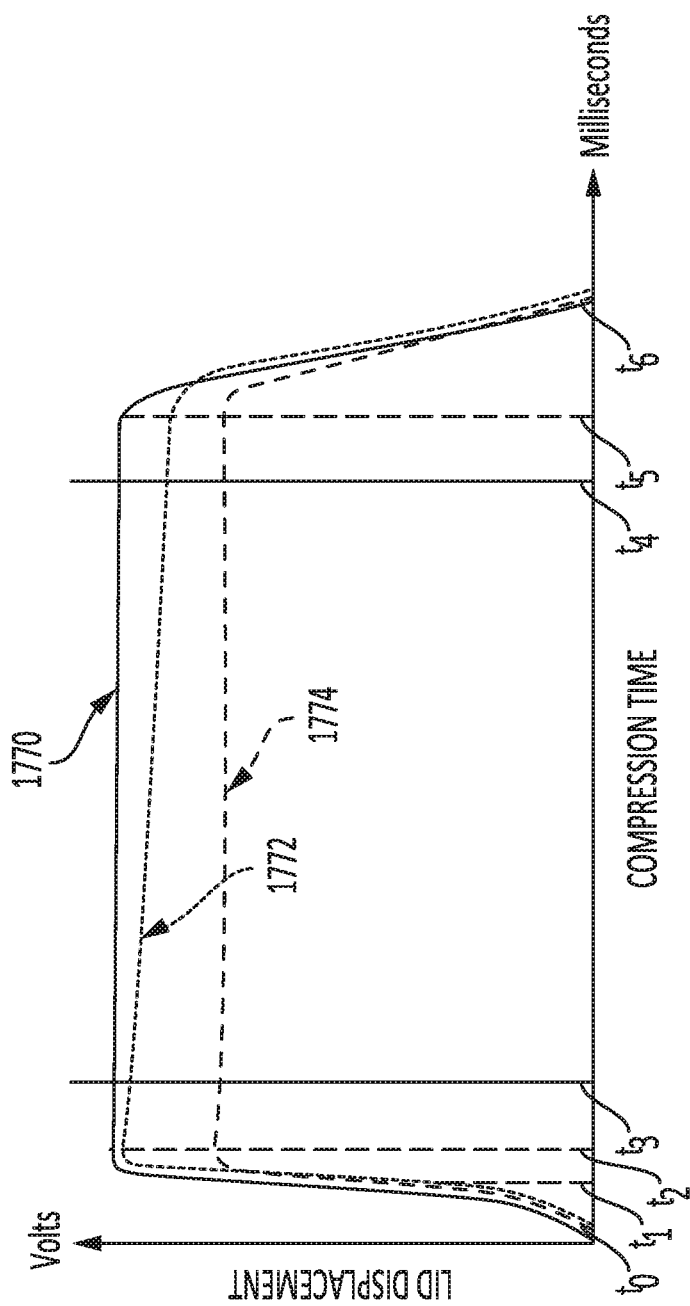

FIG. 16 is a graph of a measurement response of the application of the lid profile measurement sensor of FIG. 4 on a flexible lid, in accordance with an aspect of this disclosure.

Figure 17A:
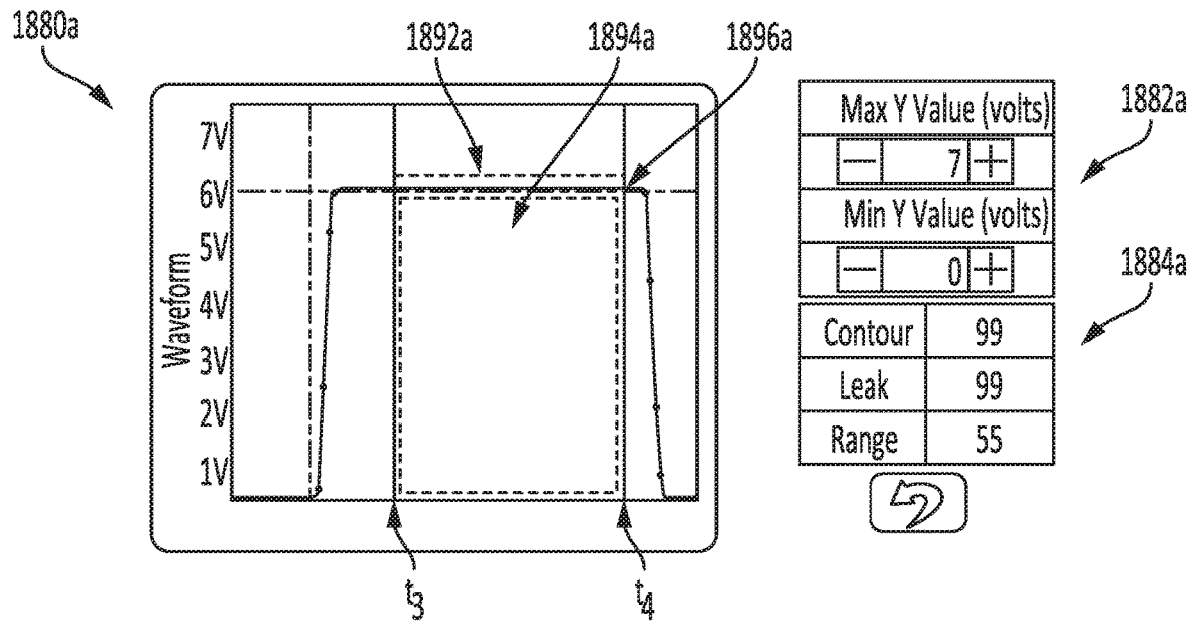
Figure 17B:
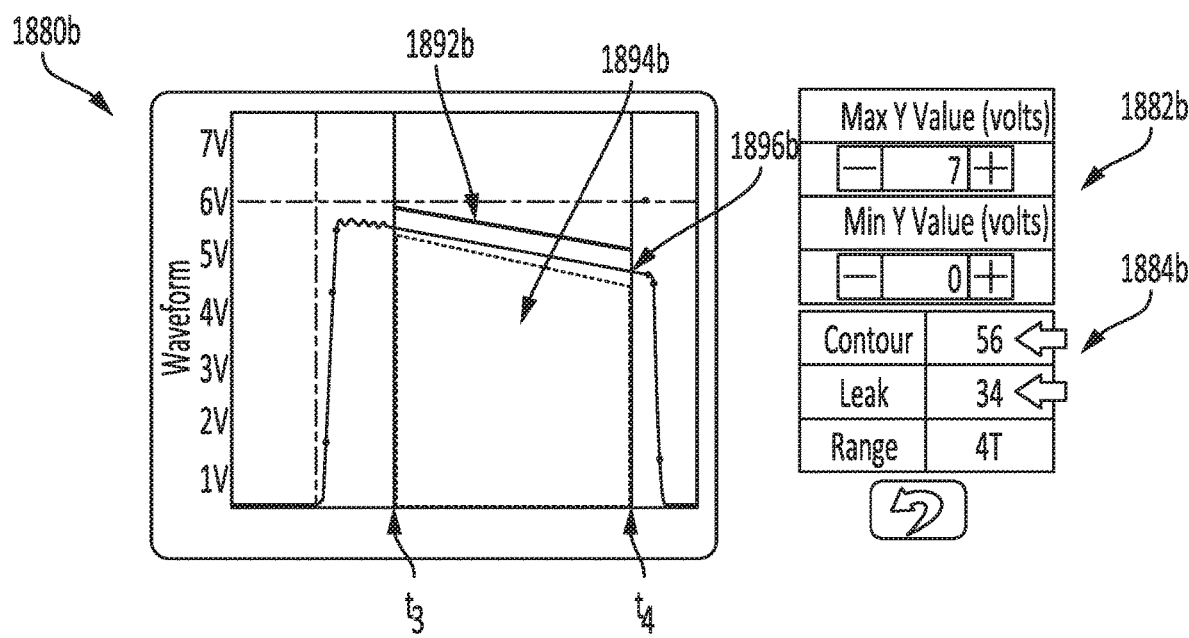

FIGS. 17A and 17B depict aspects of a computer generated graphical output indicating a measurement of a flexible lid having an intact seal and a leaking seal, respectively, in accordance with an aspect of this disclosure.

Figure 18:
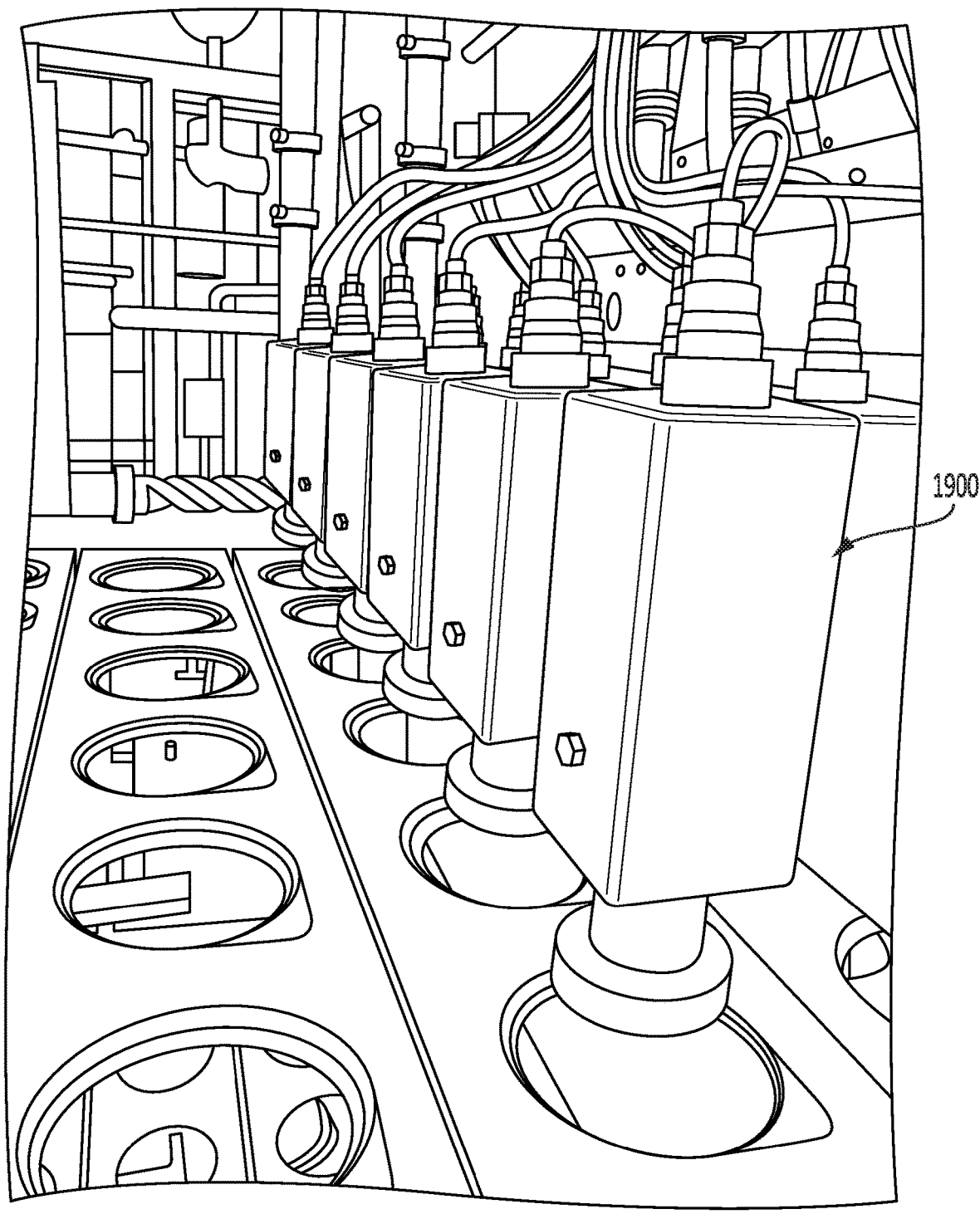

FIG. 18 depicts a "Form, Fill, Seal" manufacturing environment wherein a lid profile measurement sensor may be deployed, in accordance with an aspect of this disclosure.

DESCRIPTION

In various aspects, a flexible lid seal detector device or system is disclosed. The flexible lid seal detector device may be used to determine if a flexible lid, applied to a container of a material, forms an intact seal or if the seal is compromised. In one aspect, the flexible lid seal detector device may be used to detect lid seal integrity of a container containing a edible material, such as yoghurt. The container may be flexible or rigid, and the flexible lid may be made of any appropriate material including, without limitation, a thin plastic or a thin metal (such as aluminum foil). The seal between the lid and the container may be fabricated using any appropriate technology including, without limitation, gluing or welding. It may be understood that an intact seal may be one in which the seal is continuously intact along a perimeter of the flexible lid and is configured to form a seal with an appropriate portion of a lip of the container underneath. A seal that is leaky or otherwise not intact may have one or more air gaps in the seal between the flexible lid and the lip of the container. The flexible lid seal detector device disclosed herein is designed to determine if a flexible lid does not form an intact seal with a lip of a container to which it is mated.

In various aspects, a flexible lid seal detector system may include a compression body that may include one or more sensors therein. The flexible lid seal detector system may also include a translation device configured to controllably raise or lower the compression body either towards or away from a flexible lid under test. In an alternative aspect, the flexible lid seal detector system may also include a translation device configured to controllably raise or lower a container including the flexible lid under test so that the flexible lid approaches or recedes from the one or more sensors. The one or more sensors disposed within the compression body may be configured to monitor the shape of a flexible lid of a container. Data generated by the one or more sensors may be used as input to a control device incorporated in the flexible lid seal detector device. In some aspects, the control device may include at least one processor and at least one memory component. The at least one memory component may include a static memory component configured to store instructions directing the one or more processors to carry out one or more mathematical and/or logical processes or algorithms. In another aspect, the at least one memory component may include a dynamic memory component configured to dynamically store data that may be obtained from the one or more sensors or other devices. The one ore more algorithms may be configured to use the data generated by the one or more sensors along with any other data to determine an integrity state of the seal joining the flexible lid to the container.

The control device may further include one or more input and/or output interfaces. In some aspects, the one or more output interfaces may include interfaces to the translation device configured to control the motion of the compression body. The one or more memory components of the control device may include instructions that, when executed by the one or more control device processors may cause the one or more processors to control the movement of the compression body through data transmitted from an output interface to an input interface of the translation device. The control device may include an output interface configured to drive a display device. The memory component of the control device may include instructions that, when executed by the one or more control device processors, will cause the one or more control device processors to transmit data to the display device thereby allowing a user to receive data related to the integrity of a flexible lid seal from the display device.

In some aspects, the one or more input interfaces may include interfaces configured to receive positional data from the translation device. The instructions in the one or more memory components of the control device that control the operation of the translation device may use the positional data from the translation device to control its direction, rate of motion, or other parameters related to the control of the positioning of the compression body and the sensor. The one or more input interfaces may include an interface to receive data from the sensor related to the position of the flexible lid when under the lid test sequence. Additional sensors configured to transmit data to the control device though the one or more input interfaces may provide environmental data including ambient temperature, humidity, and atmospheric pressure. In some aspects, additional sensors may transmit temperature data related to a temperature of the container under test to the control device. In one aspect, an input interface may receive data from a user controlled input device. Non-limiting examples of such input devices may include a keyboard, a mouse, an input from a touch-sensitive display screen, or other device. The data transmitted to the control device via the one or more input interfaces may be used as inputs to control the translation device or to set parameters of the one or more algorithms configured to analyze the integrity of a flexible seal under test. In some alternative aspects, a computer program based on one or more machine learning or artificial intelligence algorithms may provide the input data to control the translation device or to set the parameters of the one or more algorithms configured to analyze the integrity of a flexible seal under test.

In some additional aspects, the control device may include one or more communications interfaces, which may be configured to permit the control device to communicate with electronic or computing devices that are not components of the flexible lid seal detection system. Such communication interfaces may include interfaces associated with wireless communication or wired communication. Examples of wireless communication may include, without limitation, WiFi communication, Bluetooth® communication, or other telecommunication protocol. Examples of wired communication may include, without limitation, a serial communication link and a Ethernet communication link. Data transmitted from the control device over the one or more communication interfaces may be used to communicate flexible lid test results for archival purposes.

As disclosed above, the control device may be in data communication with one or more electronic or computing devices that are not components of the flexible lid seal detection system. Such other electronic or computing devices may include, without limitation, a separate display device, a tablet computer device, a laptop computer, a cell phone, a smart phone, or a server. In some aspects, the other electronic or computing devices may be proximate to the flexible lid seal detection system, for example in the same room, the same floor, or the same building as the flexible lid seal detection system. In some other aspects, the other electronic or computing devices may be distant from the flexible lid seal detection system, for example, in another room, another floor, another building, or a remote site.

The other electronic or computing devices may include one or more processors, interfaces, and memory components. The interfaces may include communication interfaces which may be in data communication with the flexible lid seal detection system. In one aspect, the other electronic or computing devices may include memory components configured to store data obtained by the other electronic or computing device from the flexible lid seal detection system. In some aspects, the flexible lid seal detection system may initiate data transmission to the other electronic or computing device (a data push operation). In some other aspects, the other electronic or computing device may initiate the data transmission from the flexible lid seal detection system (a data pull operation). In some additional aspects, the other electronic or computing devices may display information to a user regarding the data received from the flexible lid seal detection system.

In some further aspects, the other electronic or computing devices may archive data received from the flexible lid seal detection system in the one or more memory components. It may be understood that such archived data may represent data associated with the operation of the mechanical components of the flexible lid seal detection system. Examples of such mechanical data may include a speed of a vertical motion of the compression body, a total or relative vertical travel of the compression body, data related to one or more physical characteristics of the compression body including, for example, a make or model number of the compression body, or other data associated with the mechanical components and/or operations of the flexible lid seal detection system. The data archived by the other electronic or computing device may also include identification data associated with the flexible lid seal detection system such as a date and/or time-stamp indicating when the data were acquired. In some aspects, the archived mechanical data may be used to track the operation of the flexible lid seal detection system or any of its components over a period of time. For example, a user of the flexible lid seal detection system may use the archive to determine if mechanical components are not acting within a known tolerance and should be replaced or repaired. In some aspects, the flexible lid seal detection system may obtain some or all of the archived mechanical data from the other electronic or computing device for mechanical self-diagnostic purposes.

Alternatively, such archived data may represent data associated with data obtained from the one or more sensors of the flexible lid seal detection system. The archived sensor data may be raw data produced by the sensors or the archived sensor data may result from one or more analyses of the data produced by the sensors. The archived sensor or analysis data may include additional identification data such as a date and/or time stamp of data acquisition, identification of the flexible lid seal detection system and/or mechanical components thereof (such as the compression body), and/or data related to products being tested when the sensor data are obtained. The product-related data may include, without limitation, dimensions of the product container, composition and dimensions of the flexible lid, and the contents of the container (the product). In this manner, the other electronic or computing device may archive data related to products being tested as well as the test results and analyses. In some aspects, the archived sensor and analysis data may be used to track the operation of the flexible lid seal detection system or any of its components over a period of time. In one example, raw sensor data may be tracked over time to determine if sensor failure occurs or if sensor recalibration is necessary. In another example, a user of the flexible lid seal detection system may use the archive to determine if seal failure is detected with an increased frequency over time. Such data may suggest that the form/fill/sealing device requires mechanical maintenance. Alternatively, seal failure may be found to be more prevalent with specified container types or dimensions, specified lid material or dimensions, or specified products. A user of the flexible lid seal detection system may use the data archived in the other electronic or computing device or devices for such long term trend analysis.

In some aspects, the compression body may include two or more shaping rims configured to apply a uniform mechanical pressure to the flexible lid during in-line manufacturing of the product. During the inspection process of the seal between the flexible lid and its associated container, the compression body may be moved towards the container until it contacts the flexible lid. The compression body may then continue its travel and apply pressure to the flexible lid using mechanical force. The inspection process may occur rapidly while the compression body is in contact with the flexible lid. The flexible lid seal detector device, including the compression body and its one or more sensors, may be sufficiently mobile to be moved from one position to another in the ambient manufacturing environment. Rapid product inspection is essential because the inspection cannot interrupt the continuous manufacturing environment of the product. FIG. 18 depicts such a continuous manufacturing environment of a "Form, Fill, and Seal" process. Such a process may include forming a container from a stock material, filling the container with a product, and then sealing the container using the flexible lid.

In some aspects, the container seal inspection process may use multiple data analysis techniques to monitor the shape of the flexible lid. In some aspects, one, two, three, or more data analysis techniques embodied in computer instructions may be used to monitor the shape of the flexible lid and its changes over a predetermined period of time. If the flexible lid shape changes during the predetermined period of time in a manner considered significant according to the analyses calculated by the algorithms, the flexible lid seal detector device may provide an output to a user indicating that there is a lack of seal integrity and that the user should reject the container.

Reference will now be made in detail to several aspects, including aspects showing example implementations of a flexible lid seal detector. Wherever practicable similar or like reference numbers may be used in the figures and may indicate similar or like functionality. The figures depict example aspects of the disclosed systems and/or methods of use for purposes of illustration only. One skilled in the art will readily recognize from the following description that alternative example aspects of the structures and methods illustrated herein may be employed without departing from the principles described herein.

Figure 1:
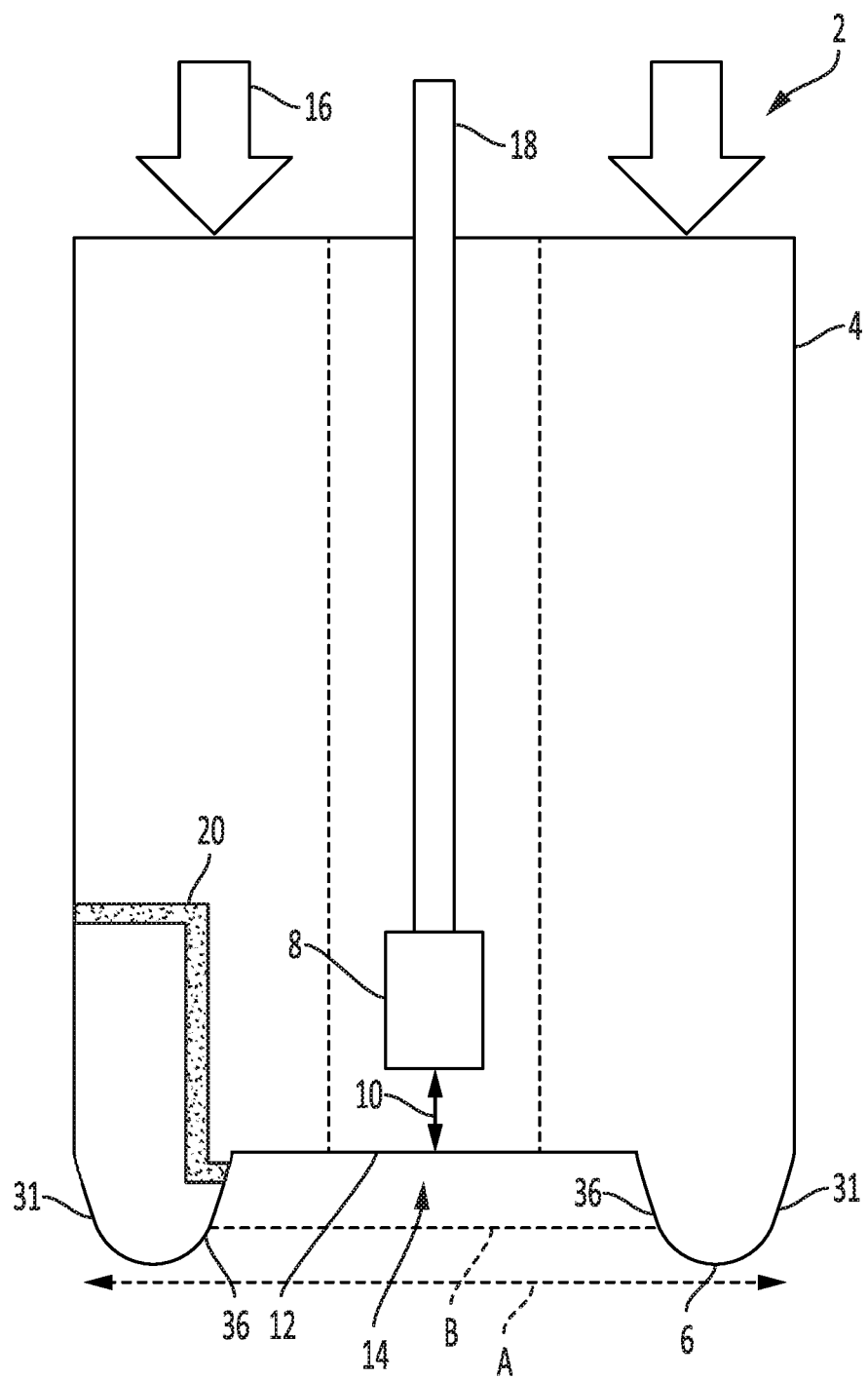
FIG. 1 illustrates a flexible lid seal detector, in accordance with a first aspect of this disclosure.

FIG. 1 illustrates a axial cross-sectional view of one aspect of a flexible lid seal detector 2 which may be incorporated in a flexible lid seal detector device. The flexible lid seal detector 2 may comprise a compression body 4. The compression body 4 may comprise a compression ring 6 extending from the distal end 12 of the compression body 4. The compression ring 6 may be configured to apply a force 16 to a flexible lid coupled to a container. The compression body 4 and/or the compression ring 6 may comprise any suitable shape for applying the force 16 to the flexible lid. For example, in some aspects, the compression body 4 and/or the compression ring 6 may comprise a circular cross-section for applying a force 16 to a circular lid. In some non-limiting aspects, the compression body 4 may be defined as a cylindrical body having an axially aligned longitudinal cavity therethrough.

The compression body 4 and/or the compression ring 6 may comprise an outer perimeter A. The compression rim may comprise an inner perimeter B. The outer perimeter A may be defined by outer shaping rim 31 of the compression ring 6. The inner perimeter B may be defined by inner shaping rim 36 of the compression ring 6. The inner perimeter B may define a recessed lid deflection volume 14. The recessed lid deflection volume 14 may comprise a hollow area or void located within the inner perimeter B defined by the inner shaping rim 36 of the compression ring 6. The recessed lid deflection volume 14 may be configured to receive a portion of a flexible lid therein. A portion of a flexible lid may be deflected into the lid deflection volume 14 when the compression ring 6 applies a force to the flexible lid. In some aspects, a pressure release 20 may be disposed within the compression body 4 and may be configured to allow a gas within the lid deflection volume 14 to vent to the atmosphere outside of the compression body 4, thereby equalizing a gas pressure within the lid deflection volume 14 with the outside atmosphere when the flexible lid contacts the compression ring 6. In some aspects, the compression ring 6 may comprise a rounded distal end. The compression ring 6 may have a smooth curvature to prevent damaging a flexible lid when the compression body 4 applies a force 16 to the flexible lid by means of the compression ring 6. The compression body 4 and/or the compression ring 6 may comprise any suitable material for applying a force 16 to a flexible lid. For example, in various examples, the compression body 4 and/or the compression ring 6 may comprise aluminum, stainless steel, and/or plastic. The material may be selected, for example, based on a material of the flexible lid to be tested, a material of the container to be tested, a strength of the flexible lid to be tested, a product type, and/or an application type.

In one aspect, the dimensions of the lid seal detector 2 may be related to the dimensions of a container and/or a flexible lid. For example, in one aspect, the compression body 4 may comprise an outer width A based on a percentage of the diameter of the flexible lid to be tested. The outer width A of the compression body 4 may correspond to, for example, about 50% to about 95% of the diameter of a flexible lid and/or a container to be inspected. In some non-limiting examples, the outer width A of the compression body 4 may correspond to about 50% of the diameter of the flexible lid, about 55% of the diameter of the flexible lid, about 60% of the diameter of the flexible lid, about 65% of the diameter of the flexible lid, about 70% of the diameter of the flexible lid, about 75% of the diameter of the flexible lid, about 80% of the diameter of the flexible lid, about 85% of the diameter of the flexible lid, about 90% of the diameter of the flexible lid, about 95% of the diameter of the flexible lid, or any value or range of values therebetween including endpoints. In some aspects, the outer width of the compression ring 6 may be equal to the outer width A of the compression body 4. An inner perimeter B of the compression ring 6 may be related to the dimensions of a container and/or a flexible lid. For example, the compression ring 6 may comprise an inner perimeter B of about 70% to about 90% of the diameter of the flexible lid. In some non-limiting examples, the inner perimeter B of the compression ring 6 may correspond to about 70% of the diameter of the flexible lid, about 75% of the diameter of the flexible lid, about 80% of the diameter of the flexible lid, about 85% of the diameter of the flexible lid, about 90% of the diameter of the flexible lid, or any value or range of values therebetween including endpoints. In another aspect, the inner perimeter B may be related to the outer width A of the compression body 4 and may comprise, for example, about 5% to about 20% of the outer width A. In some non-limiting examples, the inner perimeter B may be related to the outer width A of the compression body 4 and may correspond to about 5% of the outer width A, about 10% of the outer width A, about 15% of the outer width A, about 20% of the outer width A, or any value or range of values therebetween including endpoints. Those skilled in the art will recognize that the above numbers are given merely as examples, and that any suitable outer width A and/or inner diameter B may be used.

In some aspects, a sensor 8 may be coupled to the compression body 4 and may be positioned to detect the deflection of a flexible lid within the deflection area. The sensor 8 may be formed integrally with the compression body 6, or may be attached to the distal end 12 of the compression body 4. In some aspects, the sensor 8 may be located within the longitudinal cavity in the cylindrical compression body 4. The cavity may comprise an open distal end 12 and the sensor 8 may detect the deflection of the flexible lid within the lid deflection volume 14 through the cavity. In some aspects, the sensor 8 may be positioned concentric with the compression body 4. The sensor 8 may be positioned any suitable distance 10 from the flexible lid deflection volume 14 to facilitate proper detection of the deflected flexible lid. In some aspects, the sensor 8 may be coupled to one or more processors through a wired and/or wireless connection. For example, the sensor 8 may be electrically coupled to one or more processors by a wire 18. In some aspects, the sensor 8 may receive power from the wire 18.

The sensor 8 may comprise any suitable sensor for detecting the deflection of the flexible lid into the recessed lid deflection volume 14, such as, for example, analog or digital sensors. In some aspects, the sensor 8 may comprise a proximity sensor configured to detect the distance between a flexible lid and the sensor 8. The distance between the flexible lid and the sensor 8 may vary based on the amount of deflection of the flexible lid. The sensor 8 may comprise any suitable proximity sensor, such as, for example, a magnetic proximity sensor, a photoelectric proximity sensor, a capacitive proximity sensor, an eddy-current sensor, an inductive proximity sensor, a laser rangefinder proximity sensor, a radiofrequency proximity sensor, and/or an ultrasonic proximity sensor, to name just a few. In some aspects, the sensor 8 may comprise a pressure sensor configured to detect a pressure increase within the recessed lid deflection volume 14 caused by the deflection of a flexible lid, such as, for example, an electronic pressure sensor. The pressure increase may correspond to the amount of deflection of the flexible lid. The sensor 8 may comprise any suitable pressure sensor, such as, for example, a manometer, a pressure gauge, a capacitive pressure sensor, a piezoresistive strain gauge, an electromagnetic pressure sensor, a piezoelectric pressure sensor, an optical pressure sensor, a resonant pressure sensor, a thermal pressure sensor, or an ionization pressure sensor, to name just a few.

In some aspects, the sensor 8 may comprise one or more electrical contacts on the distal end 12 of the compression body 4. The electrical contacts may be located, for example, at the center point of the distal end 12 and on the compression ring 6. The electrical contacts may be configured to measure a resistance of the flexible lid, which may change in response to an amount of deflection of the flexible lid. For example, in one aspect the flexible lid may comprise a foil material. The resistance of the foil material may change proportionally to the amount of deflection of the flexible lid. The change in resistance may be detected by electrical contacts on the compression body 4 and/or the compression ring 6. In some aspects, the sensor 8 may comprise a load cell to measure a center pressure of the flexible lid. The load cell may comprise, for example, a metal or plastic load cell.

In some aspects, the sensor 8 may comprise an analog sensor configured to detect the distance between the sensor 8 and the flexible lid within a given range. The amount of deflection of the flexible lid may correspond to the integrity of a seal between the flexible lid and a container. The analog proximity sensor may have a specific range of measurement. For example, in one aspect, the analog proximity sensor may have about a 6 mm measurement range. The analog proximity sensor may produce an output, for example, of about 0V to about 10V, proportional to the distance between the sensor 8 and the flexible lid. Some non-limiting examples of the analog proximity sensor output may include about 0V, about 2V, about 4V, about 6V, about 8V, about 10V, or any value or range of values therebetween including endpoints. Some alternative sensor output values may range between 0V and 5V, or between 0V and 12V, or between 0V and 24V, or any voltage range appropriate for the design of the sensor 8. The output of the analog proximity sensor may be analyzed to determine the quality of a seal between the flexible lid and the container. For example, a good seal may correspond to a higher output of the analog proximity sensor than a bad seal.

In some aspects, the sensor 8 may be electrically coupled to a signal processing module. The signal processing module may comprise, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control device, previously described, may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. The signal processing module, for example, may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). In some aspects, the signal processing module may be a separate device from the control device and may be in data communication therewith according to any communication protocols as known in the art. In some alternative aspects, the control device may further include the signal processing module as a component therein, in which the signal processing module may be in data communication with the addition components of the control device. Those having skill in the art will recognize that the subject matter described herein may be implemented in an analog or digital fashion or some combination thereof.

The signal processing module may receive a signal from the sensor 8 indicative of the amount of deflection of the flexible lid. The signal processing module may determine, based on the signal from the sensor 8, the integrity of the seal between the flexible lid and the container. In some aspects, the signal processing module may be configured to provide a warning to an operator for a low integrity seal. In some aspects, the signal processing module may be incorporated into the control device and may incorporate or communicate with the at least one processor and/or the at least one memory component thereof.

Figure 2:
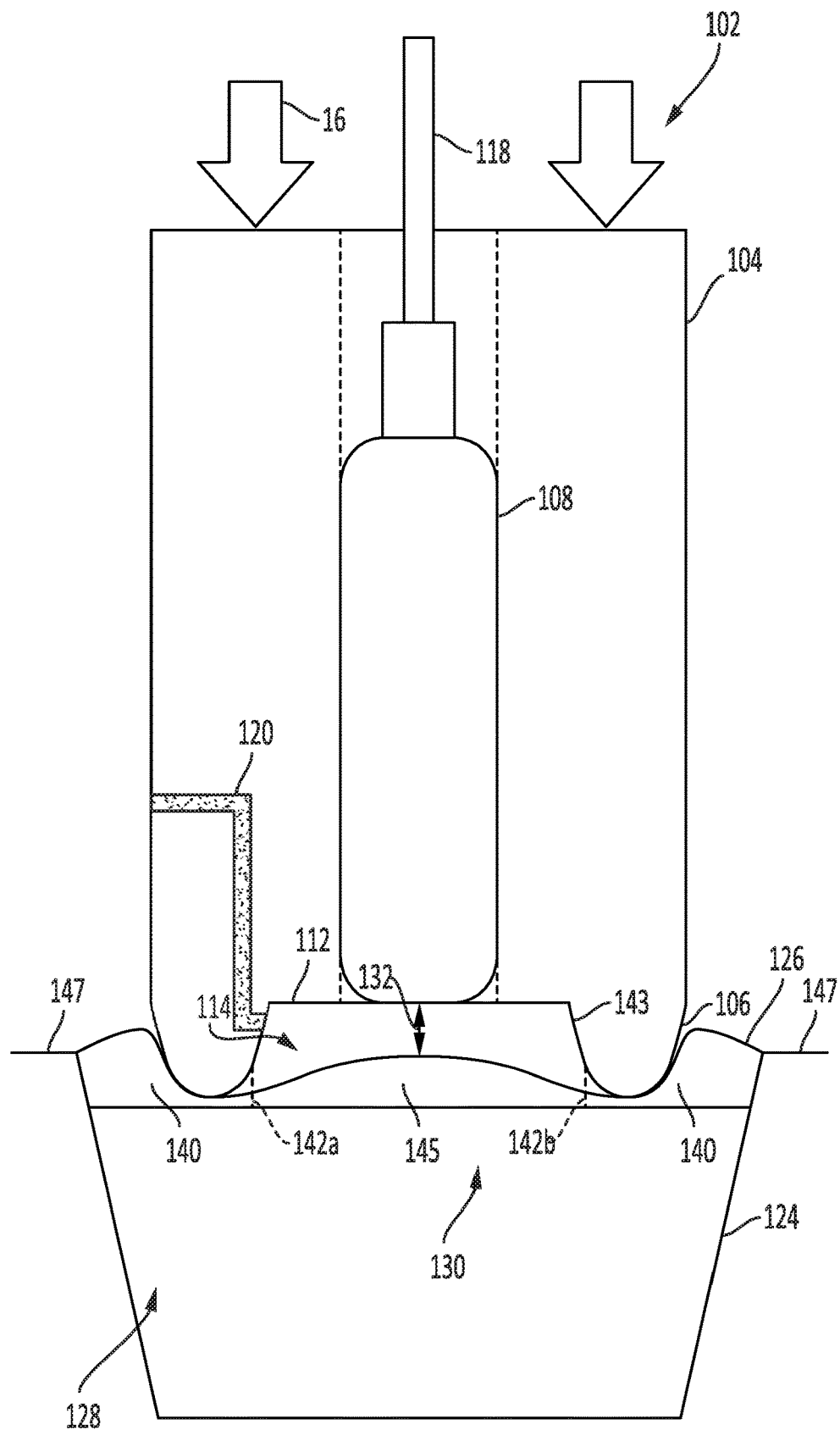
FIG. 2 illustrates a flexible lid seal detector in use with a flexible lid comprising an intact seal, in accordance with an aspect of this disclosure.

FIG. 2 illustrates one aspect of a flexible lid seal detector and a flexible lid comprising a good seal. FIG. 2 particularly illustrates the effect on a flexile lid, sealed to a lip of a container, upon receiving the compression body applied with sufficient force to deform the flexible lid. The flexible lid seal detector 102 may comprise a compression body 104 and a single compression ring 106 extending from the distal end 112 of the compression body 104. The compression ring 106 may comprise an inner shaping rim and an outer shaping rim. The inner shaping rim may define a flexible lid deflection volume 114. The compression ring 106 may be configured to apply a force 16 to a flexible lid 126 coupled to a container 124, at a container lip 147. The container may comprise any suitable container for storing a product 128, such as, for example, a rigid, semi-rigid, or flexible container. The flexible lid 126 and the container 124 may form a seal therebetween to prevent fluids, such as air or gas, for example, from entering or exiting the container 124. In some examples, the container 124 may include a lip 147 disposed around the container 124 periphery, and to which the flexible lid 126 may be affixed.

The container 124 may comprise a headspace 130 between the product 128 and the flexible lid 126. The headspace 130 may comprise a pocket of air or other gas between the flexible lid 126 and a product 128 located in the container 124. In some aspects, the headspace 130 may include a predetermined amount of air or gas. In some other aspects, the headspace 130 may include a volume of air or gas at a particular ratio to the volume of the product 128 in the container 124. The volume of gas in the headspace 130 may be chosen to prevent product overfilling or potential seal contamination by the flexible lid 126. The headspace 130 may provide a buffer between the product 128 and the flexible lid 126. In some aspects, the product 128 may comprise, at least partially, a gas and the headspace 130 may not be included. Those skilled in the art will recognize that references throughout the current disclosure to headspace and headspace pressure may apply equally to a container 124 comprising a gaseous product without a headspace 130.

In some aspects, the compression ring 106 may be configured to apply a force 16 to the flexible lid 126. Specifically, the compression ring 106 may be configured to apply the force 16 to a portion of the flexible lid 126 located within an inner diameter of the container 124. More specifically, once the force 16 is applied to the flexible lid 126, the compression ring 106 may deform the flexible lid 126 thereby functionally dividing the headspace 130 into two spaces. The headspace 130 disposed at an outer portion of the deformed flexible lid 126 may be defined as a seal stress volume 140. The headspace 130 disposed in an inner portion of the deformed flexible lid 126 may be defined as a lid shape volume 145. A boundary 142a,b between the outer seal stress volume 140 and the inner lid shape volume 145 may be functionally defined by the inner shaping rim 143 of the compression ring 106. The headspace 130 may develop a headspace pressure in response to the force 16. A portion of the flexible lid 126 may deflect into the recessed lid deflection volume 114 in response to the headspace pressure. For example, in the aspect shown in FIG. 2, a downward force 16 is applied by the compression ring 106 to the outer perimeter of the flexible lid 126 just inside the lip 147 of the container 124. The downward force 16 may cause the headspace pressure to develop within the headspace 130 and results in the center of the flexible lid 126 deflecting into the lid deflection volume 114. The portion of the flexible lid that deflects into the recessed lid deflection volume 114 may depend on the shape and/or area of the compression ring 106.

When the downward force 16 is applied by the compressing ring 106, pressure is transmitted to the headspace 130. The pressure may be applied both to the outer seal stress volume 140 of the headspace 130 as well as to the lid shape volume 145 of the headspace 130. The pressure applied to the outer seal stress volume 140 of the headspace 130 may result in pressure applied to the flexible lid seal. If pressure is applied to flexible lid seal, a defect to the flexible lid seal may cause a pressure-induced breach at the seal. A breach of the flexible lid seal may permit gas in the outer seal stress volume 140 to escape the container at the seal breach. The loss of gas through the breach may result in a loss of the total volume of gas within the headspace 130, thereby reducing the total headspace pressure, for example at the lid shape volume 145. Loss of headspace pressure at the lid shape volume 145 may result in a decrease of lid deflection into the lid deflection volume 114. A change in the amount of lid deflection into the lid deflection volume 114 may be detected by the sensor 108.

The deflection of the flexible lid 126 into the recessed lid deflection volume 114 may be detected by a sensor 108. The sensor 108 may be located in any suitable location on the compression body 104 and positioned to detect the deflection of the flexible lid 126. For example, in the illustrated aspect, the sensor 108 may be located concentrically with the compression body 104. The sensor 108 may be configured to detect the deflection of the center portion of the flexible lid 126. The sensor 108 may comprise any suitable sensor for detecting the deflection of the flexible lid, such as, for example, a pressure sensor, a proximity sensor, and/or a contact sensor. In some aspects, the sensor 108 may be located in any suitable position to detect deflection of the flexible lid 126, such as, for example, on the distal end 112 of the compression body 104. The sensor 108 may detect an amount of deflection of the flexible lid 126. The sensor 108 may determine the amount of deflection of the flexible lid 126, for example, by measuring a center gap height 132 between the deflected portion of the flexible lid 126 and the distal end 112 of the compression body 104. In some aspects, the compression body 104 may comprise a pressure release 120 (similar to pressure release 20, see FIG. 1) to allow excess pressure to be released from the lid deflection volume 114. In some aspects, the pressure release 120 may have a first portion in fluid communication with the lid deflection volume 114 and a second portion in fluid communication with the ambient environment, for example at a location along the side of the compression body 104. It may be recognized that in some aspects, the pressure release 120 may simply comprise an open air-way between the lid deflection volume 114 and the ambient environment. Such an open air-way may permit the air space in the lid deflection volume 114 to equalize with the ambient air pressure without any obstruction. In some aspects, the center gap height 132 may be adjusted based on the type of flexible lid 126, the container 124 to be measured, and/or the type of sensor 108. The center gap height 132 may be adjusted, for example, by increasing a height of the compression ring 106, the ensure that the amount of deflection of a flexible lid 126 comprising a good seal or a bad seal is within the measurement range of the sensor 108. For example, in some aspects, the sensor 108 may comprise an analog proximity sensor with a specific range of measurement. The center gap height 132 may be adjusted such that the specific range of measurement of the analog proximity sensor is configured to detect deflection responses for flexible lids comprising good seals or bad seals. In some aspects, the center gap height 132 may be related to a diameter of the flexible lid 126. For example, the center gap height 132 may be a percentage of the diameter of the flexible lid 126.

In some aspects, the amount of deflection of the flexible lid 126 may correspond to the integrity of a seal between the flexible lid 126 and the container 124. For example, a high integrity, or good, seal between a container 124 and a flexible lid 126 may cause the headspace 130 to develop a higher headspace pressure than a low integrity, or bad, seal. A higher headspace pressure may correspond to a higher deflection of the flexible lid 126. When the integrity of the seal is low, the headspace pressure may be lower or may not be present at all. For example, if the seal between the flexible lid 126 and the container 124 comprises a low integrity seal, air may be able to leak into or out of the container. A container 124 with a low integrity seal may be referred to as a leaker. When pressure is applied to a flexible lid 126 comprising a low integrity seal, the air within the headspace 130 will leak from the container and the headspace 130 will be unable to develop proper headspace pressure. A low integrity seal may comprise various types of leaks, such as, for example, a micro-leaking seal, a slow-leaking seal, or a gross-leaking seal.

Figure 3:
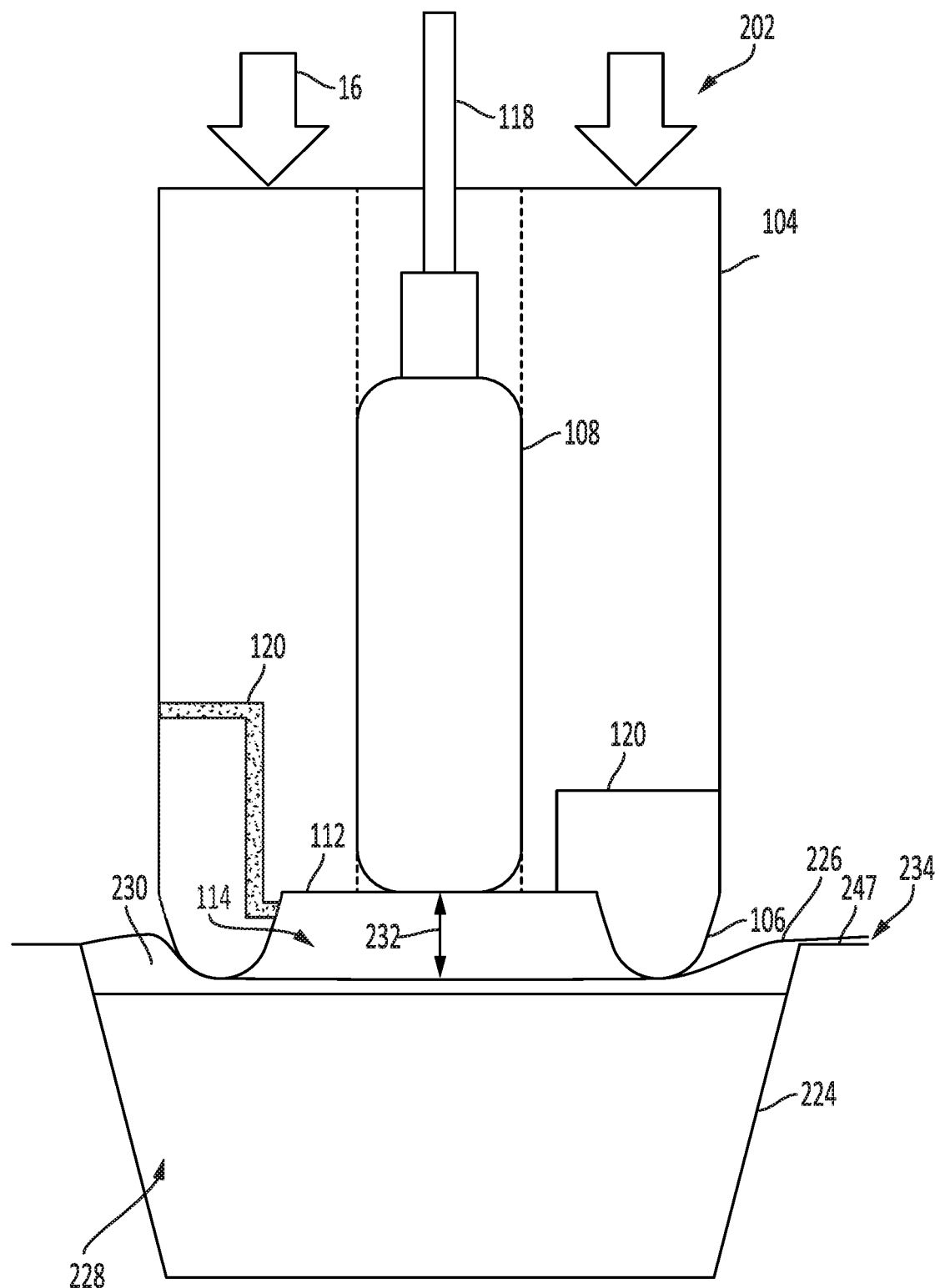
FIG. 3 illustrates a flexible lid seal detector in use with a flexible lid comprising a leaky seal, in accordance with an aspect of this disclosure.

FIG. 3 illustrates one aspect of a flexible lid detector 102 and a flexible lid 226 comprising a low-integrity seal. The container 224 and the flexible lid 226 comprises a low integrity seal 234 comprising, for example a gap between the flexible lid 226 and the container 224 at the contain lip 247. Such a gap may permit air to escape from or enter the container 224. Similar to the aspect shown in FIG. 2, when a force 16 is applied to the flexible lid 226 by the compression ring 106, the compression ring 106 forces the flexible lid 226 into the headspace 230. However, because of the low integrity of the seal 234, air may be forced out of the container 224 through the gap. As a result of the loss of air through the gap, the headspace 230 may not develop sufficient headspace pressure to fully deflect the flexible lid 224 into the lid deflection volume 114. In some aspects, as particularly depicted in FIG. 3, the seal 234 may have such low integrity that the seal 234 may not retain any headspace pressure and may result in no deflection, or in some cases compression, of the flexible lid 226. In such examples, the headspace 230 cannot form separate outer seal stress volume 140 and lid shape volume 145 as depicted in FIG. 2. It may be understood that there may be qualitative or quantitative differences between a high integrity seal and a low integrity seal. For example, a sealed container having a slow leaking seal may initially demonstrate a lid deflection pattern of a high integrity seal but, over time, the loss of air within the headspace may result in a decrease in metrics associated with a high integrity seal. In another example, a sealed container having a fast leaking seal may never demonstrate a lid deflection pattern of a high integrity seal even at the outset of the seal measurement by the flexible lid detector 102.

FIG. 4 depicts a second aspect of a compression body 404 of a flexible lid detector. Compression body 404 may have a cylindrical shape having a longitudinal cylinder axis and include a central cavity 403 in which a sensor, such as 108 in FIG. 3, may be disposed. In some aspects, the central cavity may also be cylindrical having a longitudinal cavity axis coaxial with the longitudinal cylinder axis of the compression body. The primary feature of compression body 404 that distinguishes it from compression body 104 of FIG. 3, is that compression body 404 includes two compression rings 406a,b disposed at the distal end 412 of compression body 404. Compression rings 406a and 406b may be mutually concentric, and having the centers of each compression ring 406a and 406b disposed along a central axis of the central cavity 403. The central axis of the central cavity 403 may be co-axial with a longitudinal axis of the compression body 404. In some aspects, the compression rings 406a and 406b may be disposed concentric to and surrounding the central cavity 403 of the compression body 404. As disclosed above regarding compression ring 106, compression rings 406a,b may have a general circular aspect and may protrude from the surface of the distal end 412. Each compression ring 406a,b may further be defined by an outer shaping rim 431a,b and an inner shaping rim 436a,b. Specifically, compression ring 406a may be defined by an outer shaping rim 431a and an inner shaping rim 436a, and compression ring 406b may be defined by an outer shaping rim 431b and an inner shaping ram 436b. Although FIG. 4 depicts a compression body with two compression rings, it may be understood that a compression body for a flexible lid detector may include any number of compression rings disposed thereon. Thus, a compression body may include one compression ring, two compression rings, three compression rings, or any integer number of compression rings. Each of the one or more compression rings may be circular and extend from a distal end of the compression body. In some examples, at least some of the multiple compression rings may extend the same distance from the distal end of the compression body. In some alternative examples, each of the multiple compression rings may extend a different distance from the distal end. It may be recognized that the multiple compression rings may include some compression rings extending the same distance from the compression body distal end while other compression rings may extend a different distance from the compression body distal end. Additionally, each of the one or more compression rings may be characterized by an outer shaping rim and an inner shaping rim. It may also be understood that the compression body 404 depicted in FIG. 4 may include similar features as the compression body 4 illustrated in FIG. 1. Thus, the compression body 404 and/or the compression rings 406a,b may comprise aluminum, stainless steel, and/or plastic. The material may be selected, for example, based on a material of the flexible lid to be tested, a material of the container to be tested, a strength of the flexible lid to be tested, a product type, and/or an application type.

Figure 5:
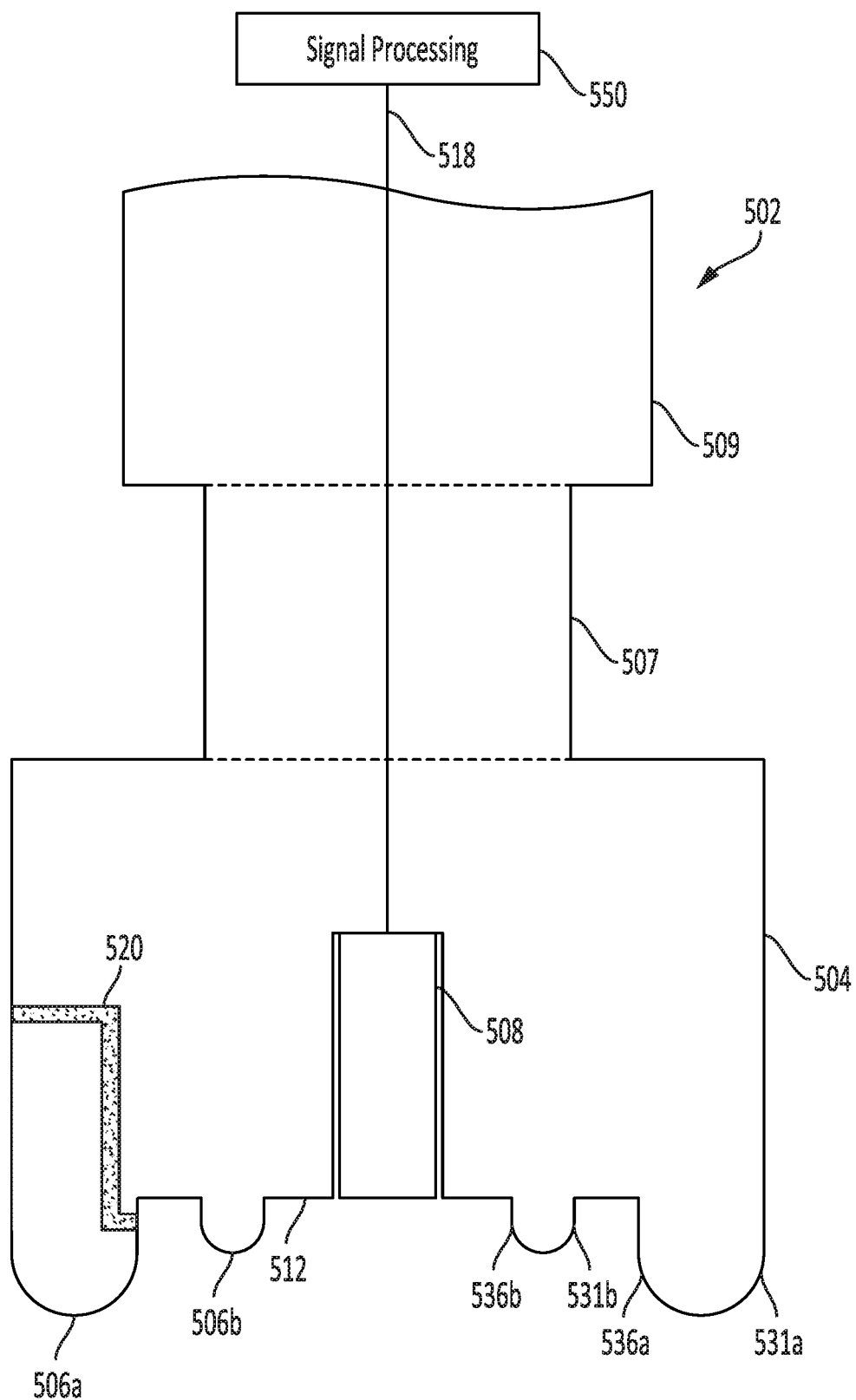
FIG. 5 illustrates an aspect of a flexible lid seal detector incorporating the compression body of FIG. 4, in accordance with an aspect of this disclosure.

FIG. 5 illustrates a compression body, such as compression body 504 (similar to compression body 404 illustrated in FIG. 4), disposed as part of a flexible lid detector 502. As depicted in FIG. 5, one aspect of a flexible lid detector 502 may include a compression body 504 in mechanical communication with a bearing surface 507 which, in turn, is in mechanical communication with a translation device 509. The translation device 509 may be in mechanical communication with a mechanism configured to cause the compression body 504 to translate in a vertical direction thereby allowing the distal end 512 of the compression body 504 to reversibly contact a top surface of a flexible lid attached to a container. The mechanism to cause the translation of the translation device 509 may be one known in the art and which is configured to control such a vertical motion. Some non-limiting mechanisms may include a pneumatic mechanism, a hydraulic mechanism, or a gear-driven mechanism. The bearing surface 507 may couple the motion of the translation device 509 to the compression body 504. The bearing surface 507 (or cylindrical body) may facilitate the travel of the compression body 504 when applying the prescribed external force to a flexible lid of a container. Separately, the proximal end of the compression body 504 is comprised of, or coupled to, the translation device 509 which performs the travel actuation of the compression body 504, as disclosed above.

The compression body 504 has similar features as that of the compression body 404 depicted in FIG. 4. Thus, compression body 504 includes two compression rings, 506a and 506b, wherein compression ring 506b is disposed within compression ring 506a. Both compression rings 506a,b extend from the distal end 512 of the compression body 504. Each compression ring 506a and 506b can be characterized by an outer shaping rim (531a,b) and an inner shaping rim (536a,b). Particularly with respect to FIG. 5, the outer compression ring 506a can be characterized by an outer shaping rim 531a and an inner shaping rim 536a. Similarly, the inner compression ring 506b can be characterized by an outer shaping rim 531b and an inner shaping rim 536b. The compression rings 506a,b extend in a distal direction from the distal end 512 of the compression body 504. The composition of the compression rings 506a,b may be the same as that previously disclosed with respect to compression rings 406a,b and compression rings 6 (FIG. 1) and 106 (FIG. 2). As disclosed above, the translation device 509 may facilitates a design goal of the outer shaping rim 530a of the outer compression ring 506a applying a uniform circumferential pressure of about 11 lb/sq.in. (about 76 kPa) to the flexible lid. Depending on the flexible lid material used this may result in the shaping rim being about 0.062 inches to about 0.19 inches (or about 1.6 mm to about 4.8 mm) sub-flush from the tangential contact surface. To account for variances in the flexible lid material, a constant force spring (not shown) may be used in the compression body 504 to apply a prescribed pressure with a total maximum travel of 0.605" (15.4 mm) of the compression body. This particular value limit has been empirically determined to be the plastic/elastic inflection curve of the least flexible lid materials used in industry today when using the selected constant force spring.

The compression body 504 may also include a pressure release, 520. In some aspects, the pressure release 520 may have a first portion in fluid communication with the lid deflection volume and a second portion in fluid communication with the ambient environment, for example at a location along the side of the compression body 504. The compression body 504 may also include a sensor 508 disposed in an axial cavity therein, the sensor 508 configured to detect a distance to and shape of a flexible lid when the compression body 504 is disposed against the flexible lid during a test sequence. Sensor 508 may have the same characteristics and functions as disclosed above with respect to sensor 8 (see FIG. 1) or sensor 108 (see FIG. 2). Additionally, sensor 508 may produce electrical signals related to the shape, size, and distance of the sensor to a flexible lid when the compression body 504 contacts the flexible lid during a flexible lid test sequence as disclosed below. It may be understood that the electrical signals generated by the sensor 508 may be conveyed to a signal processing device 550 by means of any suitable signal conducting medium. The signal processing device 550 may operate in a manner similar to the signal processing device disclosed with respect to data received from sensor 8 according to FIG. 1, above.

Figure 6:
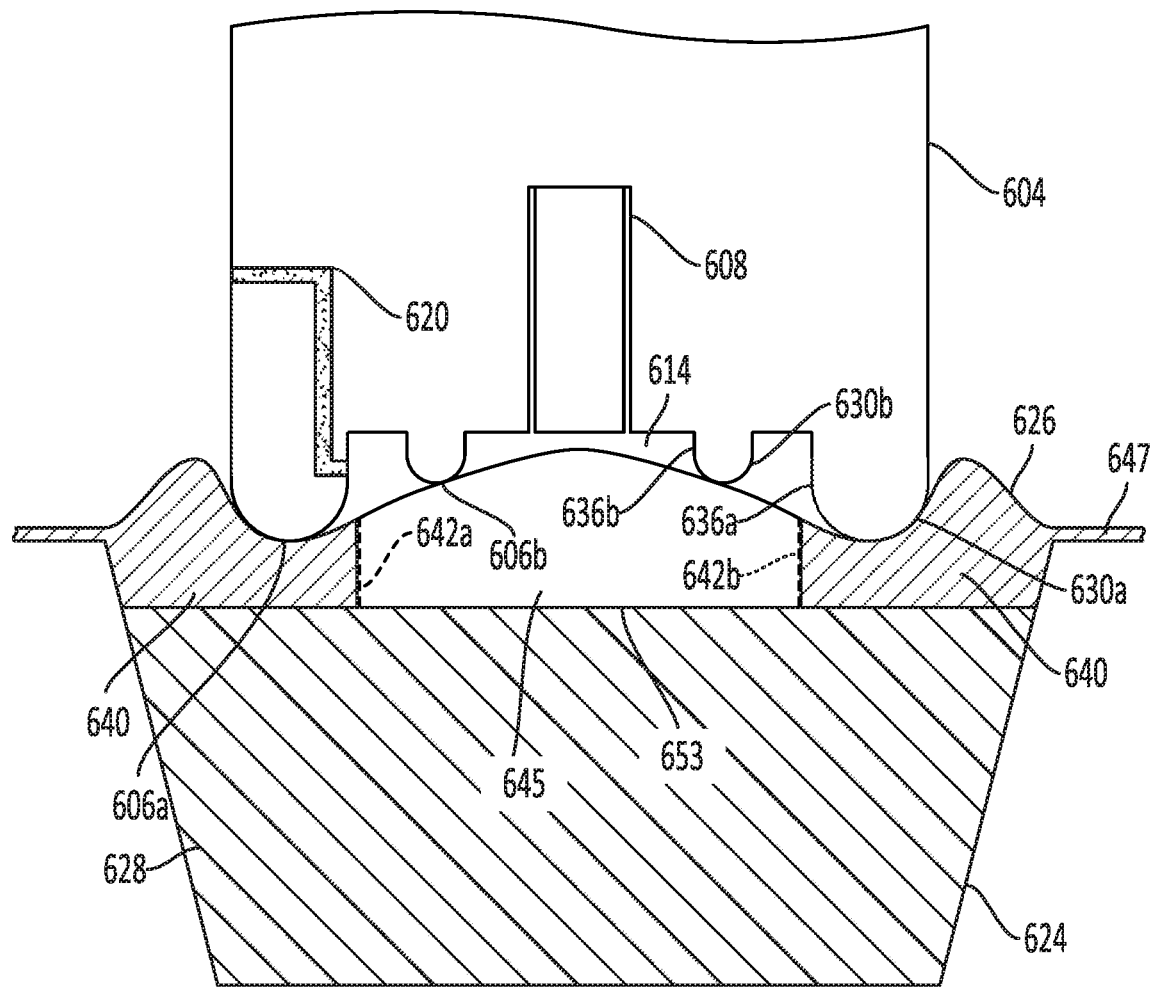
FIG. 6 illustrates an application of the flexible lid seal detector of FIG. 4 on a sealed flexible lid, in accordance with an aspect of this disclosure.

FIG. 6 depicts the application of the compression body 604 (similar to 504 and 404 of the previous figures) to a flexible lid 626 attached to a container 624. As illustrated in FIG. 6, a seal may be made between the flexible lid 626 and a lip 647 of the container 624. A translation device (not shown) may be used to position the compression body 604 with respect to the flexible lid 626. During a flexible lid testing sequence, the translation device may lower the compression body 604 until it forms an initial contact with the flexible lid 626. In some aspects, the initial contact may result in a distal end of one of the compression rings, such as outer compression ring 606a, to physically contact a portion of the flexible lid 626. As the flexible lid testing sequence continues, the translation device may move the compression body 604 further in a downward direction, thereby administering additional force to the flexible lid 626. The translation device may drive the compression body 604 a distance sufficient to apply a predetermined force to the flexible lid 626. The sensor 608 may transmit electronic data to the signal processing device during the testing sequence. Such electronic data may be related to characteristics of the flexible lid 626 in response to receiving a compression force from the compression body 604 during the testing sequence.

Particular features of the container 624 and flexible lid 626 may be apparent in FIG. 6. For example, the container 624 may contain a product 628 that fills the container 624 up to a fill line 653. The product 628 may be a liquid product, a gelled product, a semi-solid or viscous product, or a solidified product. The product 628 may be at ambient temperature, below ambient temperature, or above ambient temperature during the testing sequence. It may also be understood that the container 624 is held at ambient conditions of both pressure and temperature during the testing sequence. In some aspects, the container 624 may be secured during the testing sequence to prevent the container 624 from moving during the testing sequence. However, any mechanisms to secure the contain 624 may not isolate the container 624 from the ambient environment either in terms of temperature or pressure.

FIG. 6 particularly illustrates the effect of pressure or a compression force applied to the flexible lid 626 of a well-sealed container 624 by the compression body 604 during a compression phase of a testing sequence. As disclosed above regarding FIG. 2, during the compression phase of a testing sequence, the compression body 604 applies a force to the flexible lid 626 thereby deforming the flexible lid 626 according to the shape of the distal end of the compression body 604. In the case of a well-sealed container 624, a gas-filed head-space above the product fill line 653 is distributed under the deformed flexible lid 626. For a compression body 604 comprising a pair of compression rings 606a,b, the flexible lid 626 may dome-up into a lid deflection volume 614 defined by the inner shaping rim 636a of the outer compression ring 606a and the distal end of the compression body 604. The inner compression ring 606b and its respective outer and inner shaping rims 630b and 636b may cause the flexible lid 626 within the lid deflection volume to assume a predetermined shape. In one aspect, the predetermined shape may be a domed shape in which the center or highest portion of the dome of the flexible lid 626 is disposed proximally to the sensor 608. During the application of the compressive force to the flexible lid 626 by the compression body 604, any air trapped in the lid deflection volume 614 may be vented through the pressure release 620 to the ambient atmosphere. As a result, air in the lid deflection volume 614 will not form a back-pressure against an outside surface of the flexible lid 626 which could effect the shape of the deformed flexible lid 626 within the lid deflection volume 614. In some aspects, the pressure release 620 may have a first portion in fluid communication with the lid deflection volume 614 and a second portion in fluid communication with the ambient environment, for example at a location along the side of the compression body 604.

In some aspects, the compression ring 606 may be configured to apply a force to the flexible lid 626. Specifically, the compression ring 606 may be configured to apply the force to a portion of the flexible lid 626 located within an inner diameter of the container 624. More specifically, once the force is applied to the flexible lid 626, the compression ring 606 may deform the flexible lid 626 thereby functionally dividing the gas-filled headspace above the product fill line 653 into two spaces. The headspace disposed at an outer portion of the deformed flexible lid 626 may be defined as a seal stress volume 640. The headspace disposed in an inner portion of the deformed flexible lid 626 may be defined as a lid shape volume 645. A boundary 642a,b between the outer seal stress volume 640 and the inner lid shape volume 645 may be functionally defined by the inner shaping rim 643a of the outer compression ring 606a. The headspace may develop a headspace pressure in response to the force. A portion of the flexible lid 626 may deflect into the recessed lid deflection volume 614 in response to the headspace pressure. For example, in the aspect shown in FIG. 6, a downward force is applied by the compression ring 606 to the outer perimeter of the flexible lid 626 just inside the lip 647 of the container 624. The downward force may cause the headspace pressure to develop within the headspace and results in the center of the flexible lid 626 deflecting into the lid deflection volume 614. The shape of the portion of the flexible lid 626 that deflects into the recessed lid deflection volume 614 may depend on the shape and/or area of the inner shaping rim 636a of the outer compression ring 606a and the shape and/or disposition of the inner compression ring 606b along with its outer and inner shaping rims 630b and 636b, respectively.

When the downward force is applied by the outer compressing ring 606a, pressure is transmitted to the headspace. The pressure may be applied both to the outer seal stress volume 640 as well as to the lid shape volume 645. The pressure applied to the outer seal stress volume 640 of the headspace may result in pressure applied to the flexible lid seal. If pressure is applied to flexible lid seal, a defect to the flexible lid seal may cause a pressure-induced breach at the seal. A breach of the flexible lid seal may permit gas in the outer seal stress volume 640 to escape the container at the seal breach. The loss of gas through the breach may result in a loss of the total volume of gas within the headspace, thereby reducing the total headspace pressure, for example at the lid shape volume 645. Loss of headspace pressure at the lid shape volume 645 may result in a decrease of lid deflection into the lid deflection volume 614 or a change in the shape of the flexible lid 626 within the deflection area 614. A change in the amount of lid deflection into the lid deflection volume 114 may be detected by the sensor 108.

During the compression phase of the flexible lid test sequence, the outer seal stress volume 640 is governed by the ideal gas law such that the reduction in headspace volume—due to the compressibility of air—creates an increase in pressure that results in a bulge of air at the container seal while equilibrium is being sought by the headspace. As a result, the increase of internal pressure accelerates loading on the seal joint from the difference in internal air pressure of the container headspace and external (ambient) air pressure of the surrounding manufacturing environment while not impacting the actual seal itself. The outer seal stress volume 640 is proportional to the diameter of the container 624 under test. Additionally, it is desired to perform this inspection after the headspace has nearly reached thermal equilibrium with the product 628 in the container 624 to minimize the impact of thermal changes on the internal gas pressure due to the ideal gas law.

The lid shape volume 645 will maintain its known shape if no abnormalities to the outer seal stress volume 640 occur due to accelerated loading; one type of abnormality that could occur is a breach in the flexible lid seal. In this case, the headspace would cease to be governed by the ideal gas law and instead be joined to the surrounding environmental conditions resulting in the reduction of local pressure, 'deflating' the bulge of air at the container seal. This 'bulge' elimination indicates a loss of outer seal stress volume 640 which the lid shape volume 645 will attempt to negate via its own change in pressure and/or volume. This change is detected by the sensor(s) 608 inside the compression body 604. Within the compression body 604 there is a pressure relief 620 that is configured to allow excess pressure to be released from the lid deflection volume 614.

Figure 7B:
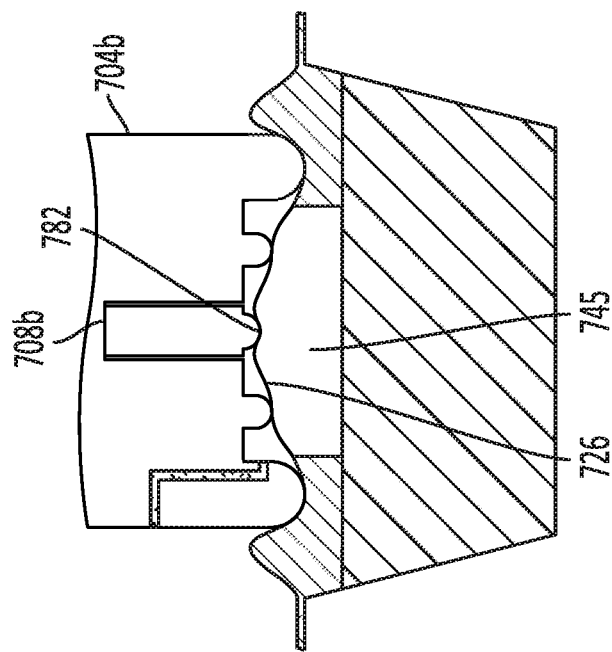
FIG. 7B illustrates a second aspect of a lid profile measurement sensor of the flexible lid seal detector of FIG. 4 applied to a sealed flexible lid, in accordance with an aspect of this disclosure.
Figure 7A:
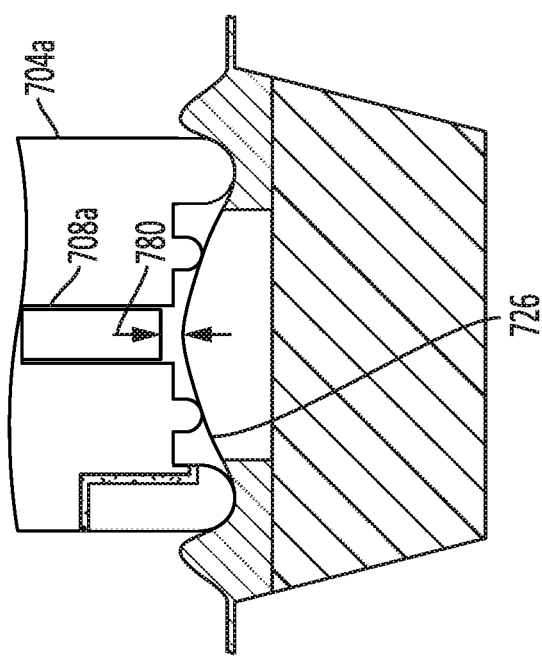
FIG. 7A illustrates a first aspect of a lid profile measurement sensor of the flexible lid seal detector of FIG. 4 applied to a sealed flexible lid, in accordance with an aspect of this disclosure.

FIGS. 7A and 7B illustrate types of sensors 708a,b that may be used for detecting the deflection of the flexible lid 726 into the recessed lid deflection volume. In some aspects, as depicted in FIG. 7A, the sensor 708a may comprise a proximity sensor configured to detect the distance between a flexible lid 726 and a distal end of the sensor 708a. The distance between the flexible lid 726 and the sensor 708a may vary based on the amount of deflection of the flexible lid 726. The sensor 708a may comprise any suitable proximity sensor, such as, for example, a magnetic proximity sensor, a photoelectric proximity sensor, a capacitive proximity sensor, an eddy-current sensor, an inductive proximity sensor, a laser rangefinder proximity sensor, a radiofrequency proximity sensor, and/or an ultrasonic proximity sensor, to name just a few. In some aspects, as depicted in FIG. 7B, the sensor 708*b* may comprise a pressure sensor, such as, for example, an electronic pressure sensor, that is configured to detect a pressure increase within the lid shape volume 745 caused by the deflection of a flexible lid 726. The pressure increase may correspond to the amount of deflection of the flexible lid 726. The sensor 708*b* may comprise any suitable pressure sensor, such as, for example, a manometer, a pressure gauge, a capacitive pressure sensor, a piezoresistive strain gauge, an electromagnetic pressure sensor, a piezoelectric pressure sensor, an optical pressure sensor, a resonant pressure sensor, a thermal pressure sensor, or an ionization pressure sensor, to name just a few.

FIGS. 8-11A, 11B, and 11C graphically depict a number of steps that may comprise a flexible lid test sequence. It may be understood that a flexible lid seal detector system as disclosed above, for example with respect to FIGS. 4-7, may be used to carry out such a flexible lid test sequence. It may be understood further that the flexible lid seal detector system may accomplish the required steps of the flexible lid test sequence by manipulating the position of the compression body and acquiring data from the sensor using, for example, a control device or signal processing module as previously disclosed. For example, instructions for one or more processors to cause a position of the compression body to change may be included in a group of instructions stored in the one or more memory components of the control device. Instructions for causing the processor or signal processor to receive electrical data representing pressure or proximity data from the sensor may also be stored in the memory components.

FIG. 8 illustrates an initial step of a lid test sequence. In this initial step, the compression body 804 including a sensor 808 is disposed a distance above a flexible lid 826 of a container 824. The container 824 and the flexible lid 826 have been through a process intended to form a seal 825 between the container 824 and the flexile lid 826. The container 824 has been filed with a product 828 up to a fill line 853. The air or gas above the fill line 853 in the container 824 comprises the headspace 830. At this step, there is no contact between the compression body 804 and the flexible lid 826.

FIGS. 9A-C illustrate an initial step of a lid test sequence in which the temperature of the contents of the container may be less than (FIG. 9A), about equal to (FIG. 9B) or greater than (FIG. 9C) the ambient temperature. FIGS. 9A-C depict a similar stage in the lid test sequence as illustrated in FIG. 8. In this step, compression body 904*a-c* is disposed above the sealed container 924*a-c* so that the distal end of the compression body 904*a-c* does not contact the flexible lid 926*a-c*. Each container 924*a-c* is filled with a product 928*a-c* up to a fill line 953*a-c*. The air or gas space between the fill line 953*a-c* and the inner surface of the flexible lid 926*a-c* comprises the headspace 930*a-c*. It may be understood that the temperature of the gas in the headspace 930*a-c* may be in thermal equilibrium with the temperature of the product 928*a-c*. As a result, as a result, the gas in the headspace 930*a-c* may either expand or contract in volume in accordance with the ideal gas law, as is known in the art. Specifically, in reference to FIG. 9A, the temperature of the gas in the headspace 930*a*, which is lower than that of the ambient air, will reduce the volume of the gas in the headspace 930*a*, thus causing the flexible lid 926*a* to curve inward towards the interior of the container 924*a*. Alternatively, in reference to FIG. 9C, the temperature of the gas in the headspace 930*c*, which is greater than that of the ambient air, will increase the volume of the gas in the headspace 930*c*, thus causing the flexible lid 926*c* to curve outwards and away from the interior of the container 924*c*. In reference to FIG. 9B, the temperature of the gas in the headspace 930*b*, which is about the same as that of the ambient air, will result in neither an increase nor a decrease the volume of the gas in the headspace 930*b*, thus causing the flexible lid 926*b* to remain essentially planar.

FIGS. 10A-C illustrate a second step of a lid test sequence in which the temperature of the contents of the container may be less than (FIG. 10A), about equal to (FIG. 10B) or greater than (FIG. 10C) the ambient temperature. FIGS. 10A-C depict a test stage subsequent to that depicted in FIG. 9A-C. In this step, compression body 1004*a-c* is brought proximal to the upper surface of the flexible lid 1026*a-c* of the sealed container 1024*a-c*. Depending on the temperature dependent pre-existing curvature of the flexible lid 1026*a-c*, as illustrated in FIGS. 9A-C, different portions of the distal end of the compression body 1006*a-c* may contact the flexible lid 1026*a-c* at this step. Thus, as illustrated in FIG. 10A, an inward curvature of the flexible lid 1026*a*, due to cooled gas in the headspace, may cause the inner compression ring 1011*a* to contact the flexible lid 1026*a* before the outer compression ring 1006*a* is able to do so. In contrast, as illustrated in FIG. 10C, an outward curvature of the flexible lid 1026*c*, due to heated gas in the headspace, may cause the outer compression ring 1006*c* to contact the flexible lid 1026*c* before the inner compression ring 1011*c* is able to do so. As illustrated in FIG. 10B, a test container with a gas in the headspace having about the same temperature as ambient conditions may result in a flattened flexible lid 1026*b*. When the compression body 1006*b* contacts the flattened flexible lid 1026*b*, the flexible lid 1026*b* may be deformed into the deflection area defined by both the outer compression ring 1006*b* and the inner compression ring 1011*b* as disclosed above with respect to FIG. 6.

FIGS. 11A-C illustrate a third step of a lid test sequence in which the temperature of the contents of the container may be less than (FIG. 11A), about equal to (FIG. 11B) or greater than (FIG. 11C) the ambient temperature. FIGS. 11A-C depict a test stage subsequent to that depicted in FIG. 10A-C. In this step, compression body 1104*a-c* is used to actively compress the upper surface of the flexible lid 1126*a-c* of the sealed container 1124*a-c*. Depending on the temperature dependent pre-existing curvature of the flexible lid 1126*a-c*, as illustrated in FIGS. 9A-C, different portions of the distal end of the compression body 1104*a-c* may contact the flexible lid 1126*a-c* at this step. An inward curvature of the flexible lid 1026*a* (see FIG. 10A) due to cooled gas in the headspace, may cause the inner compression ring 1011*a* to contact the flexible lid 1026*a* before the outer compression ring 1006*a* is able to do so, as depicted in FIG. 10A. Upon the application of additional pressure, as illustrated in FIG. 11A, both outer compressing ring 1106*a* and inner compression ring 1111*a* may contact the flexible lid 1126*a* and apply pressure. The applied pressure to the flexible lid 1126*a* may cause air in the headspace below the compression rings' 1106*a*, and 1111*a* contact point to flow either into the outer seal stress volume 1140*a* or the lid shape volume 1145*a*. The additional headspace air in the outer seal stress volume 1140*a* may cause the flexible lid 1126*a* to partially dome up because the added air in the outer seal stress volume 1140*a* has no outlet for a well-sealed flexible lid 1126*a*. However, because the volume of the headspace is decreased due to the low temperature in the enclosed container 1124*a*, the flexible lid 1126*a* does not dome up very much in the lid shape volume 1145*a* and into the lid deflection volume bounded by the inner compression ring 1111*a* and the inner shaping rim of the outer compression ring 1106*a*, (see the doming effect into the lid deflection volume 614 as illustrated in FIG. 6).

In contrast, as illustrated in FIGS. 11B and C, the application of additional stress on the flexible lid 1126*b,c* of containers 1124*b,c*, in which the product was at or above ambient temperature, may result in headspace air to flow into the an outward curvature of the flexible lid 1126*b,c*, into a lid deflection volume bounded by the inner compression ring 1111*b,c* and the inner shaping rim of the outer compressions ring 1106*b,c*. Particularly, the applied pressure to the flexible lid 1126*b,c* may cause air in the headspace below the compression rings' 1106*b,c* and 1111*b,c* contact points to flow either into the outer seal stress volume 1140*b,c* or the lid shape volume 1145*b,c*. The additional headspace air in the outer seal stress volume 1140*b,c* may cause the flexible lid 1126*b,c* to partially dome up because the added air in the outer seal stress volume 1140*b,c* has no outlet for a well-sealed flexible lid 1126*b,c* (see the doming effect into the lid deflection volume 614 as illustrated in FIG. 6). In some aspects, the compression body 1106*c* applying pressure to the flexible lid 1126*c* of the container 1124*c* having a product at temperature above ambient may produce the domed flexible lid deflection after having traveled a shorter vertical distance than the compression body 1106*b* applying pressure to the flexible lid 1126*b* of the container 1124*b* having a product at ambient temperature.

FIGS. 9-11A, 11B, and 11C particularly depict the response of a well-sealed container when tested using the flexible lid seal detector. FIGS. 12-14 depict response comparisons between a well-sealed container and a poorly sealed container for containers having contents at a variety of temperatures.

FIGS. 12A and 12B compare the responses of well-sealed and poorly-sealed containers, 1224*a,b*, respectively, for a container 1224*a,b* containing a product at a temperature less than ambient (see the sequence illustrated in FIGS. 9A, 10A, and 11A). In the well-sealed container 1224*a*, the headspace 1230*a* is reduced due to the low temperature of the product below it (compared to the headspace above a product at ambient temperature). It may be observed that the flexible lid 1226*a* is disposed below the distal end of the compressing body 1206*a*, allowing a gap between the top surface of the flexible lid 1226*a* and a distal surface of the sensor 1208*a*. For the poorly-sealed container 1224*b*, the headspace 1230*b* that was initially reduced due to the low temperature of the product below it may increase in volume as ambient air is drawn into the headspace 1230*b* through a leaky seal. Thus the volume of the headspace 1230*b* of the leaky container 1225*b* may be greater than the volume of the headspace of the well-sealed container 1224*a*. It may be observed that the flexible lid 1226*b* of the leaky container 1224*b* may be disposed proximate the distal end of the compressing body 1206*b*, and that no equivalent gap between the top surface of the flexible lid 1226*a* and a distal surface of the sensor 1208*a* of the well-sealed container 1224*a* may be observed.

FIGS. 12A and 12B compare the responses of well-sealed and poorly-sealed containers, 1224*a,b*, respectively, for a container 1224*a,b* containing a product at a temperature less than ambient (see the sequence illustrated in FIGS. 9A, 10A, and 11A). In the well-sealed container 1224*a*, the headspace 1230*a* is reduced due to the low temperature of the product below it (compared to the headspace above a product at ambient temperature). It may be observed that the flexible lid 1226*a* is disposed below the distal end of the compressing body 1204*a*, allowing a gap between the top surface of the flexible lid 1226*a* and a distal surface of the sensor 1208*a*. For the poorly-sealed container 1224*b*, the headspace 1230*b* that was initially reduced due to the low temperature of the product below it may increase in volume as ambient air is drawn into the headspace 1230*b* through a leaky seal. Thus the volume of the headspace 1230*b* of the leaky container 1224*b* may be greater than the volume of the headspace of the well-sealed container 1224*a*. It may be observed that the flexible lid 1226*b* of the leaky container 1224*b* may be disposed proximate the distal end of the compressing body 1204*b*, and that no equivalent gap between the top surface of the flexible lid 1226*a* and a distal surface of the sensor 1208*a* of the well-sealed container 1224*a* may be observed.

FIGS. 13A and 13B compare the responses of well-sealed and poorly-sealed containers, 1324*a,b*, respectively, for a container 1324*a,b* containing a product at ambient temperature (see the sequence illustrated in FIGS. 9B, 10B, and 11B). In the well-sealed container 1324*a*, the headspace 1330*a* is maintained about the same volume as the headspace before the application of a force by the compression body 1304*a*. It may be observed that the flexible lid 1326*a* forms a domed shape into the lid deflection volume, and that the top surface of the flexible lid 1326*a* is proximate to a distal end of the sensor 1308*a*. It may be observed that the shape of the flexible lid 1326*b* for the poorly-sealed container 1324*b* may be similar to that of flexible lid 1326*a* under pressure from the compression body 1304*a*, and that the top surface of the flexible lid 1326*b* may also be proximate to a distal end of the sensor 1308*b*. However, for the poorly-sealed container 1324*b*, the headspace 1330*b* may have a decreased volume compared to the volume of the headspace 1330*a* of the well-sealed container 1324*a*. The volume decrease of headspace 1330*b* may be detected because the compression body 1304*b* may have to be lowered to a greater extent to measure the flexible lid 1326*b* position compared to the amount the compression body 1304*a* needs to be lowered to measure the flexible lid 1326*a* for a well-sealed container 1324*a*. Such a decrease in headspace volume may result from air in the headspace 1330*b* being driven out of the headspace 1330*b* through a leaky seal due to the force applied by the compression body 1304*b*. Thus the volume of the headspace 1330*b* of the leaky container 1324*b* may be less than the volume of the headspace 1330*a* of the well-sealed container 1324*a*. It may be observed that the flexible lid 1326*b* of the leaky container 1324*b* may also be disposed proximate the distal end of the compressing body 1304*b*, and a distal surface of the sensor 1308*b*.

FIGS. 14A and 14B compare the responses of well-sealed and poorly-sealed containers, 1424*a,b*, respectively, for a container 1424*a,b* containing a product at a temperature above ambient temperature (see the sequence illustrated in FIGS. 9C, 10C, and 11C). In the well-sealed container 1424*a*, the headspace 1430*a* is maintained about the same volume as the headspace before the application of a force by the compression body 1404*a*. It may be observed that the flexible lid 1426*a* forms a domed shape into the lid deflection volume, and that the top surface of the flexible lid 1426*a* is proximate to a distal end of the sensor 1408*a*. It can be observed that the flexible lid 1426*a* has a similar shape as that of the flexible lid 1326*a* of the container 1324*a* having its contents at ambient temperature when under compressive force due to the compression body 1304*a*. A difference between the two may be in the extra headspace volume 1430*a* due to the increased temperature of the contents of the container 1424*a* over ambient. This extra headspace volume 1430*a* may be determined because the compression body 1404*a* does not have to be lowered as far to make the measurement on the heated container 1424*a* compared to the container 1324*a* at ambient temperature. In the case of the container 1424*b* having a poor seal, the pressure placed on the flexible lid 1426*b* by the compression body 1404*b* may cause the initially domed feature (see flexible lid 1026*c* in FIG. 10C) to simply flatten out as more pressure is applied. As a result, no domed feature of the flexible lid is formed, such as in the well-sealed container 1424*a*, so the flexible lid 1426*b* does not move proximate to the sensor 1408*b*.

FIGS. 9-14 together illustrate a variety of responses that can be measured and observed when a container with a flexible lid is inspected according to the flexible seal detector as disclosed herein. Such observed responses, when measured over time, can determine the type and extent of a leak of a seal between the flexible lid and the container. It can be recognized that the sealed headspace gaseous volume may be dependent on the temperature of the contents of the container when compared to ambient temperature. As a result, the flexible lid may initially be flat, domed out, or domed inward before pressure is applied by the compression body. The shape of the flexible lid upon receiving a compressive force may be further determined by the lid deflection volume which may be defined by the one or more compression rings on the distal end of the compression body. The extent to which the compression body is lowered onto the flexible and the distance required to first contact the lid and then apply pressure are additional measurements that may provide data related to the integrity of the lid-container seal. Measurements by a proximity sensor of the distance from the sensor distal end to the exterior surface of the flexible lid may provide information related to the shape of the flexible lid during the course of the application of the compressive force by the compression body. Measurements by a pressure sensor may determine the headspace pressure (related to its volume) during the course of the application of the compressive force by the compression body. Throughout the test sequence, the container and flexible lid may be maintained at ambient temperature, humidity, and pressure. While the container may be held in a fixed position relative to the compression body by one or more retention means— such as a retaining ring, a plurality of clips, or similar devices—such retention means still permits the exterior of the container to be in contact with ambient air at ambient temperature and pressure. Data related to the ambient temperature and pressure, container volume, product fill volume, and product fill temperature may all be used to determine the extent and type of leak of a sealed container as the compression body is lowered into position and the sensor detects the lid shape and/or headspace volume or pressure when measured over time. The positioning of the compression body as it is lowered to contact and apply a known compressive force to the flexible lid during the text sequence may be controlled by a controller.

FIG. 15 depicts a cross-section of a compression body 1504 depicting an outer compression ring 1506*a* and an inner compression ring 1506*b*. Each compression ring 1506*a,b* may be composed of an outer shaping rim (1531*a,b*) and an inner shaping rim (1536*a,b*). Each compression ring 1506*a,b* may have a thickness t defined as a difference between a diameter defined by an outer shaping rim 1530*a,b* and a diameter defined by an inner shaping rim 1536*a,b*. Thus, a thickness $t_1$ of compression ring 1506*a* may be defined as the difference between the diameter ($d_{1a}$) of outer shaping rim 1531*a* and the diameter ($d_{2a}$) of inner shaping rim 1536*a*. Similarly, a thickness $t_2$ of compression ring 1506*b* may be defined as the difference between the diameter ($d_{1b}$) of outer shaping rim 1531*b* and the diameter ($d_{2b}$) of inner shaping rim 1536*b*. It may be recognized that in general, each of a plurality of compression rings R may have a thickness $t_R$ calculated as the difference between the diameter of an equivalent outer shaping rim ($d_{1R}$) and the diameter of an equivalent inner shaping rim ($d_{2R}$). It may be understood that each compression ring $t_R$ may have the same thickness or may a different thickness.

Additionally, each compression ring 1506*a,b* may be characterized by a vertical height h measured from the distal end 1512 of the compression body 1504. It may be understood that compression ring 1506*a* may be characterized by a height $h_1$ and that compression ring 1506*b* may be characterized by a height $h_2$. Height $h_1$ may be the same as height $h_2$ or the two heights may be different. It may be recognized that in general, each of a plurality of compression rings R may have a height $h_R$ calculated as a distance measured from the distal end 1512 of the compression body 1504. It may be understood that the height $h_R$ of each compression ring may be the same or may be different. In many figures depicted in this disclosure, the height $h_1$ of the outer compression ring may be greater than the height $h_2$ of the inner compression ring. It may be recognized that the relative heights of the compression rings may differ in some additional aspects.

The relative thicknesses, heights, and diameters of the compression rings 1506*a,b* and the shaping rims 1531*a,b* and 1536*a,b* of the compression body 1504 may be chosen to apply a known pressure force to a flexible lid based on the lid size. In one aspect, the diameter of a shaping rim (for example diameter $d_{1a}$ of outer shaping rim 1531*a*, diameter $d_{1b}$ of outer shaping rim 1531*b*, diameter $d_{2a}$ of inner shaping rim 1536*a*, or diameter $d_{2b}$ of inner shaping rim 1536*b*) may be chosen for each aspect of a flexible lid seal detector to meet the one or more design goals. In one example, an outer shaping rim 1531*a* of an outer compression ring 1506*a* may have a diameter chosen to be about 70% of an inner diameter of a container being measured. In some aspects, this choice of shaping rim diameter may all the flexible lid seal to be sufficiently stressed to accelerate a leak if present while not creating a leak or tear during the inspection process. In another aspect, such a choice of a shaping rim diameter may also optimally direct the air in the headspace between lid shape volume and the seal stress volume when the compression body 1504 applies compressive force to the flexible lid. Thus, a first portion of headspace air may directed to provide a testing force against the seal to test its integrity, while a second portion of headspace air may be directed towards the center of the flexible lid to force it into proximity with the sensor.

The diameter ($d_{2a}$) of the inner shaping rim 1536*a* as well as the diameter of the inner compression ring 1506*b*, the diameter ($d_{1b}$) of outer shaping rim 1531*b*, and the diameter ($d_{2b}$) of inner shaping rim 1536*b* may all be separately chosen to optimize the placement of the dome of the center of the stressed flexible lid to a known position with respect to a distal end of the sensor. In one example, the shaping rims may be chosen to optimize the position of the dome of the stressed flexible lid to a position about 0.100 inches (about 2.54 mm) away from a proximity sensor. In another example, the shaping rims may be chosen to optimize the position of the dome of the stressed flexible lid to a position about 0.010 inches (about 0.25 mm) away from a load cell location. For example, the distance, d, between the distal end of the sensor 1578 and the distal-most extent 1576 of inner compression ring 1536*b* may be about 0.155 inches (about 0.39 mm). Different models of the compression body may be characterized by different measurements corresponding to d in FIG. 15.

It may be recognized that the shape of each rim 1531*a,b* and 1536*a,b* is rounded with smooth corners so as not to impart a tearing stress to the flexible lid during the test sequence. In some aspects, the width of the inner contact area of each compression ring is less than the outer contact area for compression bodies designed for use on larger containers. On larger models of the compression body, an additional inner contact area (produced by the use of multiple inner shaping rims) may be required as the headspace within the lid shape volume is known to bias in the direction of product flow and adversely affect the location of the lid peak during compression.

It may be recognized, that the diameters of the compression rings, their thicknesses, and the relative sizes of an exterior compression ring to an interior compression ring may all be chosen to optimize the testing of flexible lids of varying sizes. The shape of the shaping rim(s), while not specifically defined in this disclosure, is/are intended to be circular to accommodate a multitude of container types and lid types and shapes. Empirical testing has demonstrated that the use of this circular geometry may result in the highest level of accuracy in the evaluation of seal integrity. The three-dimensional shape of a well-sealed flexible lid, upon receiving a compressive force applied to a specified portion of the lid surface, may be successfully modeled using appropriate mathematical formulae. The placement and shape of the outer shaping rim and inner shaping rim(s) on the distal end of the compression body may then be calculated to optimize the flexible lid response to the applied pressure based on this surface response modeling. In this manner, a compression body may be fabricated specifically designed to optimally test a flexible lid of known dimensions.

As disclosed above, a flexible lid seal test sequence may involve bringing a compression body in contact with a flexible lid and making a variety of measurements related to the shape and location of the flexible lid during the test sequence. As disclosed above, FIGS. 8 through 14 illustrate how a flexible lid may act upon receiving a compressive force from a compression body comprising one or more compression rings. FIG. 16 presents one example of a time-based response graph that may be generated by a flexible lid measurement system. As one example, FIG. 16 is a graph of a vertical displacement of a flexible lid versus time during a test sequence. In some examples, displacement may be measured in V based on an output of a proximity detector, and the time may be measured in msec. It may be recognized that such units are not limiting but are useful as examples only.

Relating the steps of the testing sequence depicted in FIGS. 9-11A, 11B, and 11C to time point on the graph depicted in FIG. 16. The initial step of a lid test sequence depicted in FIGS. 9A-C is a step wherein a compression body is not in physical contact with an exterior surface of a flexible lid. Such a step may either precede time $t_0$ or occur after time $t_6$, according to FIG. 16. At time $t_0$, the compression body may barely contact the exterior surface of the flexible lid, as illustrated in FIG. 10A-C. Between time $t_0$ and time $t_2$ (for example at time $t_1$) the compression body is lowered to increase a contact pressure on the flexible lid. At time $t_2$, the full pressure may applied to the flexible lid by the compression body, as illustrated in FIG. 11A-C. The full test pressure may be applied to the flexible lid by the compression body for a pre-determined period of time. During that time, a series of measurement of the properties of the flexible lid under pressure may be made. For example, a measurement window may be defined starting at time $t_3$ and ending at $t_4$, during which the flexible lid characteristics may be measured by the sensor and analyzed by the flexible lid test device. As shown in FIG. 16, the test characteristic may be related to an amount that the lid is displaced as measured for example by a proximity sensor disposed within the compression device. At some time $t_5$ after the end of the measurement window at time $t_4$, the compression body may be moved so that it no longer contacts the flexible lid. For example, the compression body may be completely removed from contacting the flexible lid by time $t_6$.

In FIG. 16, the flexible lid displacement is measured over the time window between times $t_3$ and $t_4$. In some examples of a good lid seal 1770, the lid displacement may increase with the pressure applied by the compression body until a maximum value is attained. This maximum value is then maintained throughout the measurement window from time $t_3$ to time $t_4$. The lid displacement then returns to its initial location as the compression body is removed. In some examples of a grossly leaking lid seal 1774, the lid displacement may increase as the pressure applied by the compression body until a maximum value is attained. However, for the grossly leaking lid seal 1774, the maximum displacement value is significantly less than that of a lid having a good seal (such as in 1770). This behavior may indicate that the seal is sufficiently compromised that the initial headspace pressure never fully develops as the compression body is applied to the flexible lid. In some examples of a slightly leaking lid seal 1772, the lid displacement may increase as the pressure applied by the compression body until a maximum value is attained. In the case of the slightly leaking lid seal 1772, the maximum displacement value may initially be about the same value as that for the lid having a good seal (such as in 1770). However, over time (such as from $t_3$ to $t_4$), air from the headspace may leak through the small breach in the seal, and the lid displacement may slowly decrease as the air is forced out from the headspace.

A response graph, such as depicted in FIG. 16, may be included as one graphical element to be presented to a user of a flexible lid seal detector disclosed herein. An example of a graphical user interface for such a detector is illustrated in FIGS. 17A and 17B. FIG. 17A illustrates a non-limiting example of a graphical user interface presenting information related to a well-sealed flexible lid. FIG. 17B illustrates a non-limiting example of a graphical user interface presenting information related to a slightly leaking flexible lid seal. It should be understood that FIGS. 17A and 17B and the disclosure that follows related thereto present only some non-limiting example of a type of graphical user interface for a flexible lid seal detector. The types of graphical interfaces along with their relative sizes and positions are also not limiting, and any other type of graphical presentation of such seal integrity data may be considered included by implication in this description. In some aspects, the graphical user output disclosed, as in FIGS. 17A and B, may be generated by one or more processors including one or more signal processors as disclosed above with respect to the control device disclosed above with respect to FIG. 1. Additional graphical presentations of data analysis, including assessments of seal integrity and warnings of seal breaches to a user, may also be calculated and presented by the user by the one or more processors including signal processors according to instructions that may be stored in one of the memory components in the control device.

The graphical interfaces depicted in FIGS. 17A and 17B may include a flexible lid response graph 1880a,b similar to the response graph depicted in FIG. 16. The graphical interfaces may also include one or more control graphics 1882a,b which the user may manipulate to set testing conditions. In some examples, control graphics 1882a,b may allow a user to set a travel limit for the motion of the compression body. In some other examples, the control graphics 1882a,b may be used by a user to set a width of a measurement window defined by times $t_3$ and $t_4$ as disclosed above with respect to FIG. 16. The graphical interfaces may also include one or more data windows 1884a,b which may present the user with specific values related to one or more analyses of the seal test data.

Considering FIG. 17A, a response graph of a well-sealed flexible lid 1880a may depict data related to one or more analyses. For example, the response graph 1880a may depict a leak response 1892a, a contour response 1894a, and a range response 1896a. A leak response 1892a may be calculated as the slope of the response curve within the measurement window defined by times $t_3$ and $t_4$. A horizontal waveform may indicate that the displacement of the flexible lid does not change over time, thus indicating a seal with good integrity. The leak response 1892a of the seal measured in FIG. 18A indicates a seal having good integrity.

A contour response 1894a may be calculated as the area under the response curve within the measurement window defined by times $t_3$ and $t_4$. Any height change in the waveform will affect the contour merit value. In one non-limiting example, the range of contour merit values may lie between (0-100) where 100 corresponds to the most robust seal. In one aspect, a value of the contour response 1894a may distinguish between a flexible lid having a good seal versus a flexible lid having a gross leak. Although both responses may have a generally flat profile for the leak response (compare 1770 and 1774 of FIG. 16) over the measurement window, the area under the response curve associated with a grossly leaking lid seal will be significantly smaller than that of a response curve for a good leak seal. Additionally, a difference in the contour response 1894a may also be related to the temperature of the product within the container (see disclosure above regarding the differences in headspace volume due to temperature in FIGS. 11A-C). Control graphics 1882a may be used to set a contour response threshold dependent on the product temperature.

A range response 1896a may be calculated as the height of the response curve at the end of the measurement window, $t_4$. In one non-limiting example, a range response merit value may range between 0 and 100, in which 100 is highest point and 0 is lowest point. For a well-sealed flexible lid, typical values of a range response 1896a may be between 60 and 80. Values for the leak response 1892a, contour response 1864a, and range response 1896a may be presented to a user in the data window 1884a. It may be observed that the data associated with the three response metrics for the well-sealed flexible lid may communicate the status of a good seal to the user.

Considering FIG. 17B, a response graph of a slowly-leaking flexible lid 1880b may depict data related to one or more analyses. For example, the response graph 1880b may depict a leak response 1892b, a contour response 1894b, and a range response 1896b. A leak response 1892b may be calculated as the slope of the response curve within the measurement window defined by times $t_3$ and $t_4$. A waveform having a negative slope over time may indicate that the displacement of the flexible lid changes over time, thus indicating a slowly leaking seal with good integrity. The leak response 1892b of the seal measured in FIG. 17B indicates a slowly leaking seal. In one non-limiting example, a leak rejection limit may be some value significantly less than about 100, such as about 85.

A contour response 1894b may be calculated as the area under the response curve within the measurement window defined by times $t_3$ and $t_4$. Such an area may be considered as an integral of the data comprising the response curve over the measurement window. Any height change in the waveform will affect the contour merit value. As depicted in FIG. 17B, the contour has a trapezoidal shape and is not a true rectangle. Therefore, the value of the contour response 1894b may indicate a slowly leaking seal because the trapezoid area is less than an area of a related rectangle.

A range response 1896b may be calculated as the height of the response curve at the end of the measurement window, $t_4$. In one non-limiting example, a range response merit value may range between 0 and 100, in which 100 is highest point and 0 is lowest point. For a poorly sealed flexible lid, typical values of a range response 1896b may be around 50 or lower. Values for the leak response 1892b, contour response 1864b, and range response 1896b may be presented to a user in the data window 1884b. It may be observed that the data associated with the response metrics corresponding to the contour metric and leak metric may be flagged (for example color coed) to indicate to a user that the lid under examination has a faulty seal.

It may be understood that the response graphs of FIGS. 16, and 17A,B, may be generated by the signal processing module referenced to aspects of a flexible lid seal detector system disclosed with respect to FIGS. 1 and 5 upon receipt of a plurality of signals from the flexible lid test device. It may be recognized that a graphical user interface may display the data related to the signals including aspects related to the analysis of those signals to provide a determination of container seal integrity to a user. The input signals may include proximity or pressure signals from the sensor imbedded in the compression body, along with signals from additional sensors which may be configured to determine an ambient temperature or pressure, as non-limiting examples. Such other sensors, including, without limitation, ambient temperature sensors, container temperature sensors, ambient air pressure, or air pressure within the lid deflection volume, may be located at various positions of the flexible lid seal detector system as may be necessary for their function. The signal processing module may receive data from such other sensors which may be used as part of the analysis algorithms or may be used as parameters to control the positioning of the sample container with respect to the compression body or the sensor housed therein.

The flexible lid integrity sensor disclosed above may analyze a flexible lid seal by measuring a plurality of characteristics simultaneously. In particular, these three characteristics may include, without limitation, a leak characteristic, a contour characteristic, and a range characteristic. Each of these characteristics may be evaluated against two threshold values to fully characterize the type and extent of seal leak detected. It may be understood that additional metrics may be measured to provide additional analyses of the flexible lid seals. In some aspects, during the measurement sequence, the deflection of a metallic foil lid may be measured using a custom analog proximity sensor which creates an analog waveform captured during the entire compression cycle. The three measurements disclosed above may measure a lid Area (contour), a lid slope (leak), and lid voltage (range) of the foil lid in relations to the sensor. Each algorithm generates a relative merit value based on that inspection which is then checked against a reject limit set for each algorithm. Any merit value that falls below the reject limit may generate a rejection signal for that sealed container which may be displayed on the graphical user display.

As disclosed above, the control device may be in data communication with one or more other electronic or computing devices not associated with the flexible lid seal detection system. The other electronic or computing device or devices may include memory components configured to archive data received from the flexible lid seal detection system. In some aspects, the archive data may include data characteristic of or associated with one or more of the leak characteristic, a contour characteristic, and a range characteristic as determined for one or more sealed containers tested by the flexible lid seal detection system. As disclosed above, the archived data may also include time and/or date identification data, and data associated with a container under test. The data associated with the container under test may include, without limitation, an identifier of a container material, dimensions of the container, an identifier of the flexible lid material, and dimensions of the flexible lid. Additional data may be associated with one or more identifiers of the container product, product temperature, ambient temperature during the test, and ambient air pressure during the test. Data may be associated with a particular product batch number as well as an identifier of the particular form/fill/seal manufacturing device used for forming, filling, and sealing a specified container under test.

As further disclosed above, the flexible lid seal detection system may be configured to store or retrieve some or all of the archived data to or from the one or more other electronic or computing devices. The control device of the flexible lid seal detection system may receive instructions from a user via a user controlled input device to retrieve the archived data. The user may also use the user controlled input device to control the graphical interfaces (for example as depicted in FIGS. 17A and 17B) to display some or all of the archived data according to the user's requirements. In one non-limiting example, a user may provide instructions to cause the graphical interfaces to display one or more lid seal characteristics from a specified group of prior tested containers. Thus, a user may provide instructions to the control device to display, for example, the contour characteristics of all containers fabricated and filed on a particular day, or of a particular batch of containers.

In some other aspects, the control device and/or signal processor may cause the one or more other electronic or computing devices to transmit some or all of the archived data for comparative purposes with data obtained from a particular container under test. Such a request for archived data and comparative analysis may be directed by a user or may be an automated process initiated by the flexible lid seal detection system. In one aspect, such a comparative analysis may be used to optimize one or more parameters used in the analysis of the characteristics of a container seal under test. In another aspect, the archived data may be used to verify the status of a particular container seal under test or refine the metrics used to characterize such as seal (for example, intact, slow leak, gross leak). In another aspect, such a comparative analysis may be used to track long-term process characteristics of the form/fill/seal manufacturing environment.

FIG. 18 depicts a "Form, Fill, Seal" manufacturing environment wherein a lid profile measurement sensor may be deployed. As may be observed, several production stations 1900 may be deployed in a production line. Each production station 1900 may take a container blank, form it into an appropriately sized container, fill the container with a product at a predetermined temperature, place a flexible lid over the filled container, and then seal the flexible lid to the filled container using any appropriate means. Alternatively, the "form, fill, seal" environment may be composed of separate stations, each separate station tasked with one step of the process. That is, one station may form the container, a separate station may fill the container, and a third station may seal the filled container. The filled and sealed containers may move along the production line from the "form, fill, seal" stations to other electronic or computing devices which may be used to package multiple containers into a single transportable container, such as a cardboard box. It may be understood that the sealed flexible lid should be tested at some stage along the production and packaging line after the container lid is sealed and before the container is shipped to a recipient.

The flexible lid seal detector disclosed herein may have a shape and form factor that is designed to be reversibly inserted with the production and packaging line for in-line container testing. Thus, the flexible lid seal detector disclosed here may be a mobile device. In some aspects, the flexible lid seal detector may be mobile so that it may be reversibly installed within the production and packaging line at any appropriate position with respect to the placement of the other "form, fill, seal" and packaging equipment. In one aspect, the flexible lid seal detector may have wheels that may allow the flexible lid seal detector to be moved from one location in the product line to another. In another aspect, the flexible lid seal detector may have wheel locks configured to lock or prevent wheel motion once the detector is properly placed. It may be understood that the flexible lid seal detector may be removed from some positions in the manufacturing line and re-inserted in other positions in the manufacturing line without interrupting the manufacturing process.

As disclosed above, the lid seal testing sequence is applied to the containers while the exterior of the containers are at ambient temperature, humidity, and atmospheric pressure. As a result, no special pressure or temperature containment is required of the containers during the lid seal testing sequence.

As disclosed above and illustrated and depicted in the accompanying figures, the sensor used to measure the properties of the flexible lids may be any appropriate sensor for the measurements. In one non-limiting example, the sensor may include a proximity sensor to determine a distance of the flexible lid to a distal end of the sensor. In another non-limiting example, the sensor may include a pressure sensor configured to probe the flexible lid thereby measuring a resistive pressure of the headspace within the container and below the flexible lid. It may be understood that a flexible lid detector system may be configured to include a specific type of sensor. Alternatively, the flexible lid detector system may be configured to receive a detachable sensor, so that a sensor of one type may be replaced by a sensor of a different type.

As disclosed above and illustrated and depicted in the accompanying figures, the sensor used to measure the properties of the flexible lids may be disposed within an axial recess or cavity within the compression body. As disclosed above, a compression body may be designed for optimal sensing with a specifically designed container. For example a first model compression body may be optimized for use with a first container having an inner diameter that may range between about 66.4 mm to about 71.4 mm. However a second model compression body may be optimized for use with a second container having an inner diameter that may range between about 85.7 mm to about 90.7 mm. It may be understood that a flexible lid detector system may be configured to include a specific type of compression body. Alternatively, the flexible lid detector system may be configured to receive a detachable compression body so that a first compression body may be replaced by a second compression body without interrupting the manufacturing flow.

In some aspects, a flexible lid seal detector is disclosed. The flexible lid seal detector may comprise a compression body. One or more compression rings may extend from a distal end of the compression body. The one or more compression rings may comprise an outer shaping rim and an inner shaping rim. The inner shaping rim may define a recessed lid deflection volume. The one or more compression rings may be configured to apply a force to a flexible lid coupled to a container. A sensor may be coupled to the compression body and positioned to detect the deflection of the flexible lid in response to the force applied to the flexible lid. The sensor may be configured to detect an amount of deflection of the flexible lid within the recessed lid deflection volume.

In some aspects the flexible lid may be fixedly attached to the container to form a seal between the flexible lid and the container. The force applied to the flexible lid may generate a headspace pressure beneath the flexible lid. The headspace pressure may be proportional to the amount of deflection of the flexible lid. The amount of deflection of the flexible lid over some period of time may correspond to an integrity of the seal. A processor may be electrically coupled to the sensor to determine the integrity of the seal based on the amount of deflection of the flexible lid in response to the force applied to the flexible lid. The force may be applied to the flexible lid by the one or more compression rings for a predetermined period. The deflection of the flexible lid may be monitored for the predetermined period.

In some aspects, the one or more compression rings may comprise a continuous distal surface about a perimeter of the compression body. Each of the one or more compression rings may comprise a rounded inner shaping rim and a rounded outer shaping rim to prevent damage to the flexible lid during compression. The sensor may comprise a proximity sensor selected from the group consisting of: a magnetic proximity sensor, a photoelectric proximity sensor, an induction proximity sensor, an eddy current proximity sensor, and a contact sensor. The sensor may be located at the distal end of the compression body. The sensor may be positioned within the recessed lid deflection volume.

In some aspects, the container may comprise a substantially rigid container. The diameter of the compression body may be configured to be less than a diameter of the flexible lid. A distance between the outer shaping rim and the inner shaping rim of each of the one or more compression rings may be selected to be less than the diameter of the compression body. The diameter of the compression body may be selected to be in the range of about 50% to about 95% of the diameter of the flexible lid and the distance between the outer shaping rim and the inner shaping rim of each of the one or more compression rings may be selected to be in the range of about 5% to about 20% of the diameter of the compression body.

While various details have been set forth in the foregoing description, it will be appreciated that the various aspects systems and methods for a flexible lid seal detector may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

It is worthy to note that any reference to "one aspect," "an aspect," "one aspect," or "an aspect" means that a particular feature, structure, or characteristic described in connection with the aspect is included in at least one aspect. Thus, appearances of the phrases "in one aspect," "in an aspect," "in one aspect," or "in an aspect" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

The foregoing detailed description has set forth various aspects of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one aspect, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative aspect of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.). In some aspects, the signal bearing medium may comprise a non-transitory storage medium.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

A sale of a system or method may occur in a territory even if components of the system or method are located and/or used outside the territory. Further, implementation of at least part of a system for performing a method in one territory does not preclude use of the system in another territory.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

In summary, numerous benefits have been described which result from employing the concepts described herein. The foregoing description of the one or more aspects has been presented for purposes of illustration and description. It is not intended to be exhaustive or limiting to the precise form disclosed. Modifications or variations are possible in light of the above teachings. The one or more aspects were chosen and described in order to illustrate principles and practical application to thereby enable one of ordinary skill in the art to utilize the various aspects and with various modifications as are suited to the particular use contemplated. It is intended that the claims submitted herewith define the overall scope.

Various aspects of the subject matter described herein are set out in the following numbered examples:

Example 1. A flexible lid seal detector comprising:
a cylindrical compression body having a longitudinal axis, comprising:
a longitudinal central cavity having an axis co-axial with the longitudinal axis of the compression body;
a distal end comprising a plurality of mutually concentric compression rings surrounding the longitudinal cavity, wherein an outer-most compression ring of the plurality of mutually concentric compression rings is defined by a first outer shaping rim and a first inner shaping rim; and
a recessed lid deflection volume defined by the inner shaping rim and a distal surface of the distal end of the compression body; and
a sensor disposed within the longitudinal cavity,
wherein the recessed lid deflection volume is configured to receive a first portion of an outer surface of a flexible lid when at least one of the plurality of compression rings contacts and applies a compressive force to a second portion of the outer surface of the flexible lid thereby deforming the first portion of the outer surface of the flexible lid into the lid deflection volume.

Example 2. The flexible lid seal detector of Example 1, wherein the plurality of mutually concentric compression rings comprises the outer-most compression ring and an inner compression ring.

Example 3. The flexible lid seal detector of Example 2, wherein the inner compression ring is defined by a second outer shaping rim and a second inner shaping rim.

Example 4. The flexible lid seal detector of Example 3, wherein the recessed lid deflection volume further comprises the inner compression ring, the second outer shaping rim, and the second inner shaping rim.

Example 5. The flexible lid seal detector of Example 4, wherein the inner compression ring, the second outer shaping rim, and the second inner shaping rim are configured to cause the first portion of the outer surface of the flexible lid within the recessed lid deflection volume to assume a predetermined shape.

Example 6. The flexible lid seal detector of Example 5, wherein the predetermined shape is a domed shape wherein a highest portion of the domed shape of the flexible lid is disposed proximal to the sensor.

Example 7. The flexible lid seal detector of any one or more of Examples 1 through 6, further comprising a pressure release having a first portion in fluid communication with the recessed lid deflection volume and a second portion in fluid communication with an ambient environment along a side of the compression body.

Example 8. The flexible lid seal detector of any one or more of Examples 1 through 7, wherein the sensor comprises a flexible lid proximity sensor.

Example 9. The flexible lid seal detector of any one or more of Examples 1 through 8, wherein the sensor comprises a flexible lid pressure sensor.

Example 10. A flexible lid seal detection system, comprising:
a flexible lid seal detector comprising:
a cylindrical compression body having a longitudinal axis, comprising:
a longitudinal central cavity having an axis co-axial with the longitudinal axis of the compression body;
a distal end comprising a plurality of mutually concentric compression rings surrounding the longitudinal cavity, wherein an outer-most compression ring of the plurality of mutually concentric compression rings is defined by a first outer shaping rim and a first inner shaping rim; and
a recessed lid deflection volume defined by the inner shaping rim and a distal surface of the distal end of the compression body; and
a sensor disposed within the longitudinal cavity;
a translation device configured to controllably raise or lower the compression body; and
a control device comprising:

at least one processor; and one or more memory components, wherein the one or more memory components are configured to store instructions that, when executed by the at least one processor, causes the at least one processor to:

cause the translation device to lower the compression body until at least one of the plurality of compression rings contacts a first portion of an outer surface of a flexible lid under test;

cause the translation device to further lower the compression body until the at least one of the plurality of compression rings applies a predetermined compressive force to the portion of the outer surface of the flexible lid, thereby deforming a second portion of the outer surface of the flexible lid to enter the lid deflection volume;

receive, from the sensor, data characterizing the second portion of the outer surface of the flexible lid;

calculate, based on the data, one or more parameters related to a quality of a seal between the flexible lid and a container attached thereto; and determine, based on the one or more parameters, the quality of the seal between the flexible lid and the container attached thereto.

Example 11. The flexible lid seal detection system of Example 10, wherein the plurality of mutually concentric compression rings comprises the outer-most compression ring and an inner compression ring, wherein the inner compression ring is defined by a second outer shaping rim and a second inner shaping rim, wherein the recessed lid deflection volume further comprises the inner compression ring, the second outer shaping rim, and the second inner shaping rim, and wherein the inner compression ring, the second outer shaping rim, and the second inner shaping rim are configured to cause the second portion of the outer surface of the flexible lid within the recessed lid deflection volume to assume a predetermined shape.

Example 12. The flexible lid seal detection system any one or more of Examples 10 through 11, further comprising a display device, and wherein the one or more memory components comprise instructions, that, when executed by the at least one processor causes the at least one processor to display to a user of the flexible lid seal detection system a graphical display of the quality of the seal between the flexible lid and the container attached thereto.

Example 13. The flexible lid seal detection system of Example 12, wherein the one or more memory components comprise instructions, that, when executed by the at least one processor causes the at least one processor to display to the user of the flexible lid seal detection system a warning that the seal between the flexible lid and the container attached thereto is defective.

Example 14. The flexible lid seal detection system of any one or more of Examples 10 through 13, wherein the data characterizing the second portion of the outer surface of the flexible lid comprises a distance of the second portion of the outer surface of the flexible lid to a distal end of the sensor.

Example 15. The flexible lid seal detection system of any one or more of Examples 10 through 14, wherein the data characterizing the second portion of the outer surface of the flexible lid comprises a measurement of a headspace pressure of an amount of gas below the outer surface of the flexible lid.

Example 16. The flexible lid seal detection system of any one or more of Examples 10 through 15, wherein the one or more instructions stored in the one or more memory components to receive, from the sensor, data characterizing the second portion of the outer surface of the flexible lid comprise one or more instructions to receive, from the sensor, data characterizing the second portion of the outer surface of the flexible lid over a pre-determined period of time.

Example 17. The flexible lid seal detection system of Example 16, wherein the one or more instructions stored in the one or more memory components to calculate, based on the data, one or more parameters related to a quality of a seal between the flexible lid and a container attached thereto comprises one or more instructions stored in the one or more memory components to calculate a difference in a plurality of values of the data over the pre-determined period of time.

Example 18. The flexible lid seal detection system of any one or more of Examples 16 through 17, wherein the one or more instructions stored in the one or more memory components to calculate, based on the data, one or more parameters related to a quality of a seal between the flexible lid and a container attached thereto comprises one or more instructions stored in the one or more memory components to store a value of the data at an end of the pre-determined period of time.

Example 19. The flexible lid seal detection system of any one or more of Examples 16 through 18, wherein the one or more instructions stored in the one or more memory components to calculate, based on the data, one or more parameters related to a quality of a seal between the flexible lid and a container attached thereto comprises one or more instructions stored in the one or more memory components to integrate a plurality of values of the data throughout the pre-determined period of time.

Example 20. A method for determining a quality of a seal between a flexible lid and a container attached thereto, the method comprising:

contacting a first portion of an outer surface of the flexible lid with a distal end of a flexible lid seal detector, wherein the distal end of the flexible lid seal detector comprises:

a distal end of a sensor disposed within a central cavity formed within the flexible lid seal detector;

a plurality of mutually concentric compression rings surrounding the longitudinal cavity, wherein an outer-most compression ring of the plurality of mutually concentric compression rings is defined by a first outer shaping rim and a first inner shaping rim; and a recessed lid deflection volume defined by the inner shaping rim and a distal surface of the distal end of the compression body;

applying a compressive force by the distal end of the flexible lid seal detector to the first portion of the outer surface of the flexible lid, thereby causing a first portion of a headspace gas within the container to move into a lid shape volume within the container and a second portion of the headspace gas to move into a seal stress volume, wherein the first portion of the headspace gas in the lid shape volume causes a second portion of the flexible lid to deform into the recessed lid deflection volume, and wherein the second portion of the headspace gas in the seal stress volume applies a stress to the seal between the flexible lid and the container attached thereto;

receiving, by a processor for a predetermined period of time, data from the sensor characterizing the second portion of the outer surface of the flexible lid;

calculating, by the processor, one or more parameters related to a quality of the seal between the flexible lid and a container attached thereto based on the data; and determining, by the processor, the quality of the seal between the flexible lid and the container attached thereto based on the one or more parameters.

Example 21. The method of Example 20, wherein contacting a first portion of an outer surface of the flexible lid with a distal end of a flexible lid seal detector, comprises contacting a first portion of an outer surface of the flexible lid with a distal end of a flexible lid seal detector wherein the distal end of the flexible lid seal detector further comprises:

an inner compression ring defined by a second outer shaping rim and a second inner shaping rim, and wherein the recessed lid deflection volume further comprises the inner compression ring, the second outer shaping rim, and the second inner shaping rim.

Example 22. The method of Example 21, wherein calculating, by the processor, one or more parameters related to a quality of the seal between the flexible lid and a container attached thereto comprises calculating one or more parameters based on a difference in a plurality of values of the data from the sensor over the pre-determined period of time.

Example 23. The method of any one or more of Examples 21 through 22, wherein calculating, by the processor, one or more parameters related to a quality of the seal between the flexible lid and a container attached thereto comprises calculating one or more parameters based on a value of the sensor data at an end of the pre-determined period of time.

Example 24. The method of any one or more of Examples 21 through 23, wherein calculating, by the processor, one or more parameters related to a quality of the seal between the flexible lid and a container attached thereto comprises calculating one or more parameters based on integrating a plurality of values of the sensor data throughout the pre-determined period of time.

Example 25. The method of any one or more of Examples 20 through 24, further comprising displaying, on a display device, graphical information indicative of the quality of the seal between the flexible lid and the container attached thereto based on the one or more parameters.

Example 26. The flexible lid seal detection system of one or more of Examples 10 through 19, further comprising one or more communication interfaces, and wherein the one or more memory components are further configured to store instructions that, when executed by the at least one processor, causes the at least one processor to:

transmit data to one or more electronic or computing devices that are not components of the flexible lid seal detection system; and receive archived data from the one or more electronic or computing devices that are not components of the flexible lid seal detection system.

Example 27. The flexible lid seal detection system of Example 26, wherein the one or more memory components are further configured to store instructions that, when executed by the at least one processor, causes the at least one processor to:

determine, based on the one or more parameters and at least a portion of the archived data, the quality of the seal between the flexible lid and the container attached thereto.

Example 28. The method of any one or more of Examples 20 through 25, further comprising:

receiving, by the processor, archive data from one or more electronic or computing devices, wherein the archive data comprise information received by the one or more electronic or computing devices from the processor.

Example 29. The method of Example 28, wherein determining, by the processor, the quality of the seal between the flexible lid and the container attached thereto based on the one or more parameters, comprises determining, by the processor, the quality of the seal between the flexible lid and the container attached thereto based on the one or more parameters and the archive data.

What is claimed is:

1. A flexible lid seal detector comprising:
a cylindrical compression body, comprising:
    a longitudinal central cavity;
    a sensor disposed within the longitudinal central cavity;
    a planar distal end comprising:
        a distal surface;
        an outer-most compression ring protruding from the planar distal end and comprising a first outer shaping rim and a first inner shaping rim:
        an inner compression ring concentric to the outer-most compression ring, protruding from the planar distal end, and comprising a second outer shaping rim and a second inner shaping rim,
        wherein the outer-most compression ring extends distally from the planar distal end, and the inner compression ring extends distally from the planar distal end in an amount less than the outer-most compression ring; and
        a recessed lid deflection volume defined by the first inner shaping rim and the distal surface;
        wherein the recessed lid deflection volume is configured to receive a first portion of an outer surface of a flexible lid when the outer-most compression ring contacts and applies a compressive force to a second portion of the outer surface of the flexible lid thereby deforming the first portion of the outer surface of the flexible lid into the lid deflection volume.

2. The flexible lid seal detector of claim 1, wherein the recessed lid deflection volume further comprises the inner compression ring, the second outer shaping rim, and the second inner shaping rim.

3. The flexible lid seal detector of claim 2, wherein the inner compression ring, the second outer shaping rim, and the second inner shaping rim cause the first portion of the outer surface of the flexible lid to assume a domed shape having a highest portion disposed proximal to the sensor.

4. The flexible lid seal detector of claim 1, wherein the sensor comprises a flexible lid proximity sensor or a flexible lid pressure sensor.

5. A flexible lid seal detection system, comprising:
a flexible lid seal detector comprising:
    a cylindrical compression body having a longitudinal axis, comprising:
        a longitudinal central cavity;
        a sensor disposed within the longitudinal central cavity;
        a planar distal end comprising:
            a distal surface;
            an outer-most compression ring protruding from the planar distal end, and comprising a first outer shaping rim and a first inner shaping rim;
            an inner compression ring concentric to the outer-most compression ring, protruding from the planar distal end, and comprising a second outer shaping rim and a second inner shaping rim,
            wherein the outer-most compression ring extends distally from the planar distal end, and the inner compression ring extends distally from the planar distal end in an amount less than the outer-most compression ring; and a recessed lid deflection volume defined by the first inner shaping rim and the distal surface
a translation device configured to controllably raise or lower the compression body; and
a control device comprising:
   a processor; and
   a memory component to store instructions that, when executed by the processor, cause the processor to:
      cause the translation device to lower the compression body until the outer-most compression ring or the inner compression ring contacts a first portion of an outer surface of a flexible lid under test;
      cause the translation device to further lower the compression body until the outer-most compression ring or the inner compression ring applies a predetermined compressive force to the portion of the outer surface of the flexible lid, thereby deforming a second portion of the outer surface of the flexible lid to enter the lid deflection volume;
      receive, from the sensor, data characterizing the second portion of the outer surface of the flexible lid;
      calculate, based on the data, one or more parameters related to a quality of a seal between the flexible lid and a container attached thereto; and
      determine, based on the one or more parameters, the quality of the seal between the flexible lid and the container attached thereto.

6. The flexible lid seal detection system of claim 5, wherein the recessed lid deflection volume further comprises the inner compression ring, the second outer shaping rim, and the second inner shaping rim, and wherein the inner compression ring, the second outer shaping rim, and the second inner shaping rim are configured to cause the second portion of the outer surface of the flexible lid to assume a predetermined shape within the recessed lid deflection volume.

7. The flexible lid seal detection system of claim 5, further comprising a display device, and wherein the memory component comprises instructions, that, when executed by the processor cause the processor to display to a user of the flexible lid seal detection system a graphical display of the quality of the seal between the flexible lid and the container attached thereto, or a warning that the seal between the flexible lid and the container attached thereto is defective.

8. The flexible lid seal detection system of claim 5, wherein the data characterizing the second portion of the outer surface of the flexible lid comprises a distance of the second portion of the outer surface of the flexible lid to a distal end of the sensor, or a measurement of a headspace pressure of an amount of gas below the outer surface of the flexible lid.

9. The flexible lid seal detection system of claim 5, wherein the memory component stores instructions to further cause the processor to receive, from the sensor, data characterizing the second portion of the outer surface of the flexible lid over a pre-determined period of time.

10. The flexible lid seal detection system of claim 9, wherein the memory component stores one or more instructions to further cause the processor to:
   calculate a difference in a plurality of values of the data over the pre-determined period of time;
   store a value of the data at an end of the pre-determined period of time; or
   integrate a plurality of values of the data throughout the pre-determined period of time.

11. The flexible lid seal detection system of claim 5, wherein the memory component stores instructions that, when executed by the processor, causes the processor to:
   receive archived data from a memory component of one or more electronic or computing devices external to the flexible lid seal detection system; and
   determine, based on the one or more parameters and at least a portion of the retrieved archived data, the quality of the seal between the flexible lid and the container attached thereto.

12. A method for determining a quality of a seal between a flexible lid and a container attached thereto, the method comprising:
   contacting a first portion of an outer surface of the flexible lid with a distal end of a flexible lid seal detector comprising:
      a longitudinal central cavity;
      a sensor disposed within the longitudinal central cavity;
      a planar distal end comprising:
         a distal surface;
         an outer-most compression ring protruding from the planar distal end and comprising a first outer shaping rim and a first inner shaping rim;
         an inner compression ring concentric to the outer-most compression ring, protruding from the planar distal end, and comprising a second outer shaping rim and a second inner shaping rim,
         wherein the outer-most compression ring extends distally from the planar distal end, and the inner compression ring extends distally from the planar distal end in an amount less than the outer-most compression ring; and
         a recessed lid deflection volume defined by the first inner shaping rim and the distal surface;
   applying a compressive force by the planar distal end of the flexible lid seal detector to the first portion of the outer surface of the flexible lid, thereby causing a first portion of a headspace gas within the container to move into a lid shape volume within the container and a second portion of the headspace gas to move into a seal stress volume,
      wherein the first portion of the headspace gas in the lid shape volume causes a second portion of the flexible lid to deform into the recessed lid deflection volume, and
      wherein the second portion of the headspace gas in the seal stress volume applies a stress to the seal between the flexible lid and the container attached thereto;
   receiving, by a processor for a predetermined period of time, data from the sensor characterizing the second portion of the outer surface of the flexible lid;
   calculating, by the processor, one or more parameters related to a quality of the seal between the flexible lid and a container attached thereto based on the data from the sensor; and
   determining, by the processor, the quality of the seal between the flexible lid and the container attached thereto based on the one or more parameters.

13. The method of claim 12, wherein calculating, by the processor, one or more parameters related to a quality of the seal between the flexible lid and a container attached thereto comprises one or more of:
   calculating one or more parameters based on a difference in a plurality of values of the data from the sensor over the pre-determined period of time;

calculating one or more parameters based on a value of the sensor data at an end of the pre-determined period of time; and calculating one or more parameters based on integrating a plurality of values of the sensor data throughout the pre-determined period of time.

14. The method of claim 12, further comprising displaying, on a display device, graphical information indicative of the quality of the seal between the flexible lid and the container attached thereto based on the one or more parameters.

15. The method of claim 12, further comprising receiving, by the processor, archive data from one or more electronic or computing devices, wherein the archive data comprise information received by the one or more electronic or computing devices from the processor, and determining, by the processor, the quality of the seal between the flexible lid and the container attached thereto based on the one or more parameters and the archive data.

\* \* \* \* \*